US012602424B2

(12) United States Patent
Gerard et al.

(10) Patent No.: US 12,602,424 B2
(45) Date of Patent: Apr. 14, 2026

(54) PROACTIVE PERSONALIZATION OF MULTIMEDIA CONTENT AND DIALOG CONTENT THROUGH UTILIZATION OF LARGE LANGUAGE MODEL(S)

(71) Applicant: GOOGLE LLC, Mountain View, CA (US)

(72) Inventors: Kyle Gerard, Zurich (CH); Carsten Isert, Zurich (CH); Florent D'Halluin, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/208,601

(22) Filed: Jun. 12, 2023

(65) Prior Publication Data

US 2024/0411798 A1     Dec. 12, 2024

(51) Int. Cl.
*G06F 16/435* (2019.01)
*G10L 13/08* (2013.01)

(52) U.S. Cl.
CPC ............ *G06F 16/435* (2019.01); *G10L 13/08* (2013.01)

(58) Field of Classification Search
CPC ............................... G06F 16/435; G10L 13/08
See application file for complete search history.

(56) References Cited

U.S. PATENT DOCUMENTS

2010/0211199 A1* 8/2010 Naik ....................... G10L 21/00
                                                             700/94
2015/0169284 A1* 6/2015 Quast .................. G06F 16/9535
                                                             704/275
2018/0121432 A1   5/2018 Parson et al.
                    (Continued)

FOREIGN PATENT DOCUMENTS

CN          110770694 A      2/2020

OTHER PUBLICATIONS

Zhang et al., "Fine-tuning Pre-trained Language Models for Few0shot Intent Detection: Supervised Pre-training and Isotropization" Proceedings of the 2022 Conference of the North American Chapter of the Association for Computational Linguistics: Human Language Technologies, pp. 532-542, dated 2022.
                    (Continued)

*Primary Examiner* — Etienne P Leroux
*Assistant Examiner* — Farhad Agharahimi
(74) *Attorney, Agent, or Firm* — Gray Ice Higdon

(57)                    ABSTRACT

Implementations described herein relate to causing a client device to initiate streaming of multimedia content and causing the client device to render dialog content before and/or during the streaming of the multimedia content. Processor(s) can generate a structured large language model (LLM) query that can be processed to generate LLM output. The LLM output can include, for example, an indication of the multimedia content and the dialog content. In some implementations, the processors(s) can determine when to generate an additional structured LLM query to continue the streaming of the multimedia content, and proactively cause additional LLM output to be generated based on the additional structured LLM query. In additional or alternative implementations, the processor(s) can determine when to cause the dialog content to be rendered with respect to the streaming of the multimedia content.

19 Claims, 9 Drawing Sheets

(56) References Cited

U.S. PATENT DOCUMENTS

| | | | |
|---|---|---|---|
| 2019/0171762 | A1 | 6/2019 | Luke et al. |
| 2019/0205727 | A1* | 7/2019 | Lin ........................ G06F 18/217 |
| 2019/0220246 | A1* | 7/2019 | Orr ........................ G06F 40/279 |
| 2020/0137230 | A1 | 4/2020 | Spohrer |
| 2021/0286855 | A1* | 9/2021 | Bayer ................ H04N 21/8133 |
| 2024/0037327 | A1* | 2/2024 | Kallepalli ............. G06F 40/211 |
| 2024/0346566 | A1* | 10/2024 | Qin .......................... G06F 40/40 |

OTHER PUBLICATIONS

Kakwani et al., "IndicNLPSuite: Monolingual Corpora, Evaluation Benchmarks and Pre-trained Multilingual Language Models for Indian Languages" Robert Bosch Centre for Data Science and AI, IIT Madras, Microsoft India, AI4Bharat.
Alan Boyle "This bot plays hot tunes: Super Hi-Fi and WellSaid Labs use AI to create a Lifelike DJ" Retrieved from https://www.geekwire.com/author/alanboyle/, 8 pages, dated Oct. 20, 2021.
Leibman et al., "The Right Music at the Right Time: Adaptive Personalized Playlists Based on Sequence Modeling" MIS Quarterly vol. 43, No. 3, pp. 765-786, DOI: 10.25300/MISQ/2019/14750, dated Sep. 2019.
"The A.I. DJ in your pocket" Retrieved from https://getradiant.app, 5 pages, dated 2023.
"Introducing Andy, the AI Radio DJ. Hyper-Realistic Radio Listening Experiences Delivered by AI" Retrieved from https://hi.wellsaidlabs.com/andy, 4 pages, dated 2023.
"Spotify Debuts a New AI DJ, Right in Your Pocket" 6 pages, dated Feb. 22, 2023.
Kirk, H. R. et al., "Personalisation within bounds: A risk taxonomy and policy framework for the alignment of large language models with personalised feedback"; arXiv.org, Cornell University; arXiv:2303.05453v1; 37 pages; dated Mar. 9, 2023.
Kasai, H. et al., "Quick Accessible Mobile Video System based on Pre-downloading, Pre-fetching and Streaming Technologies"; In proceedings of the 19th Annual IEEE International Symposium on Personal, Indoor and Mobile Radio Communications; 5 pages; dated Sep. 15, 2008.
European Patent Office; International Search Report and Written Opinion issued in Application No. PCT/US2023/034691; 15 pages; dated Feb. 15, 2024.

* cited by examiner

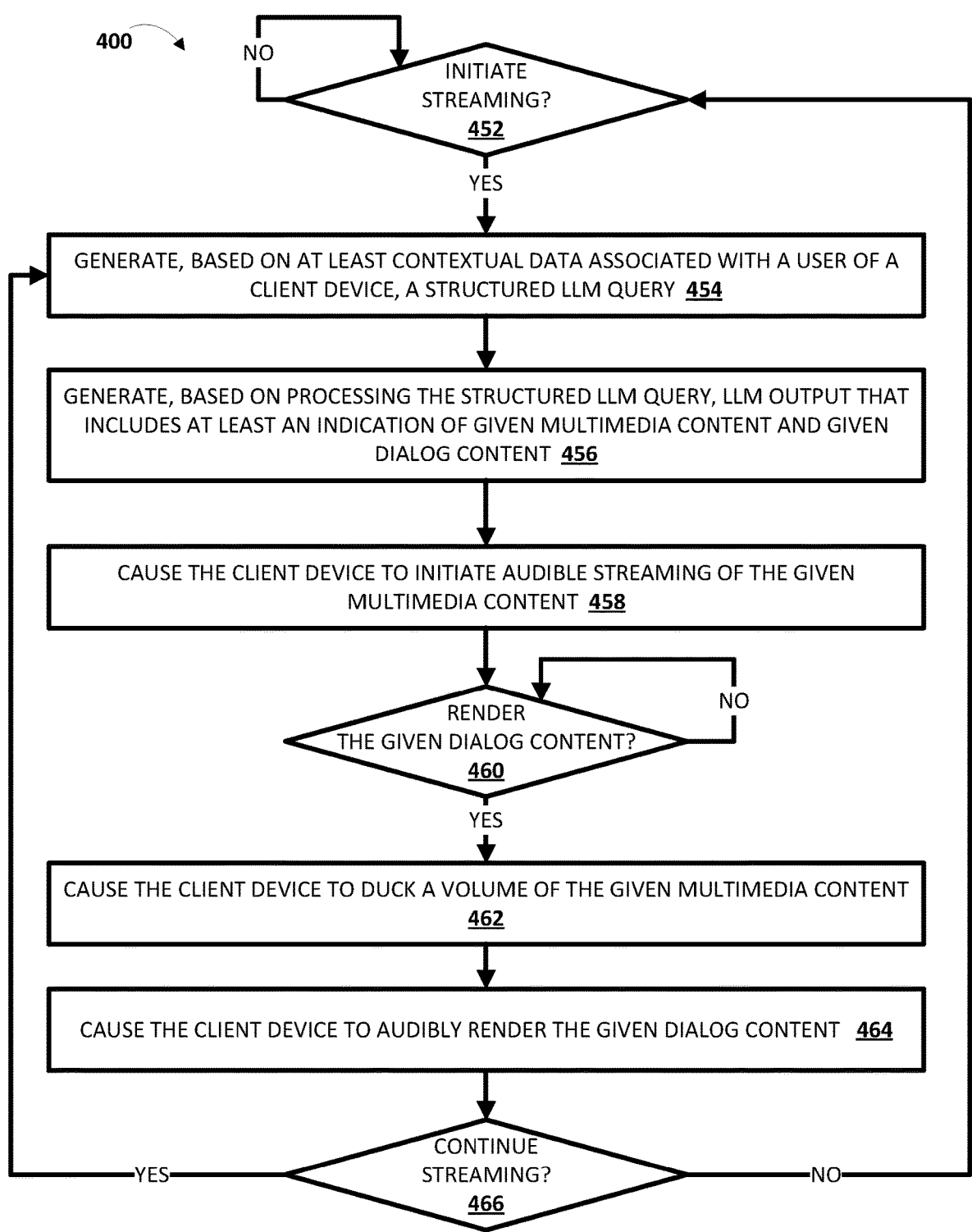

400

NO

INITIATE
STREAMING?
452

YES

GENERATE, BASED ON AT LEAST CONTEXTUAL DATA ASSOCIATED WITH A USER OF A
CLIENT DEVICE, A STRUCTURED LLM QUERY 454

GENERATE, BASED ON PROCESSING THE STRUCTURED LLM QUERY, LLM OUTPUT THAT
INCLUDES AT LEAST AN INDICATION OF GIVEN MULTIMEDIA CONTENT AND GIVEN
DIALOG CONTENT 456

CAUSE THE CLIENT DEVICE TO INITIATE AUDIBLE STREAMING OF THE GIVEN
MULTIMEDIA CONTENT 458

RENDER
THE GIVEN DIALOG CONTENT?
460

NO

YES

CAUSE THE CLIENT DEVICE TO DUCK A VOLUME OF THE GIVEN MULTIMEDIA CONTENT
462

CAUSE THE CLIENT DEVICE TO AUDIBLY RENDER THE GIVEN DIALOG CONTENT 464

CONTINUE
STREAMING?
466

YES                                                                                              NO

FIG. 4

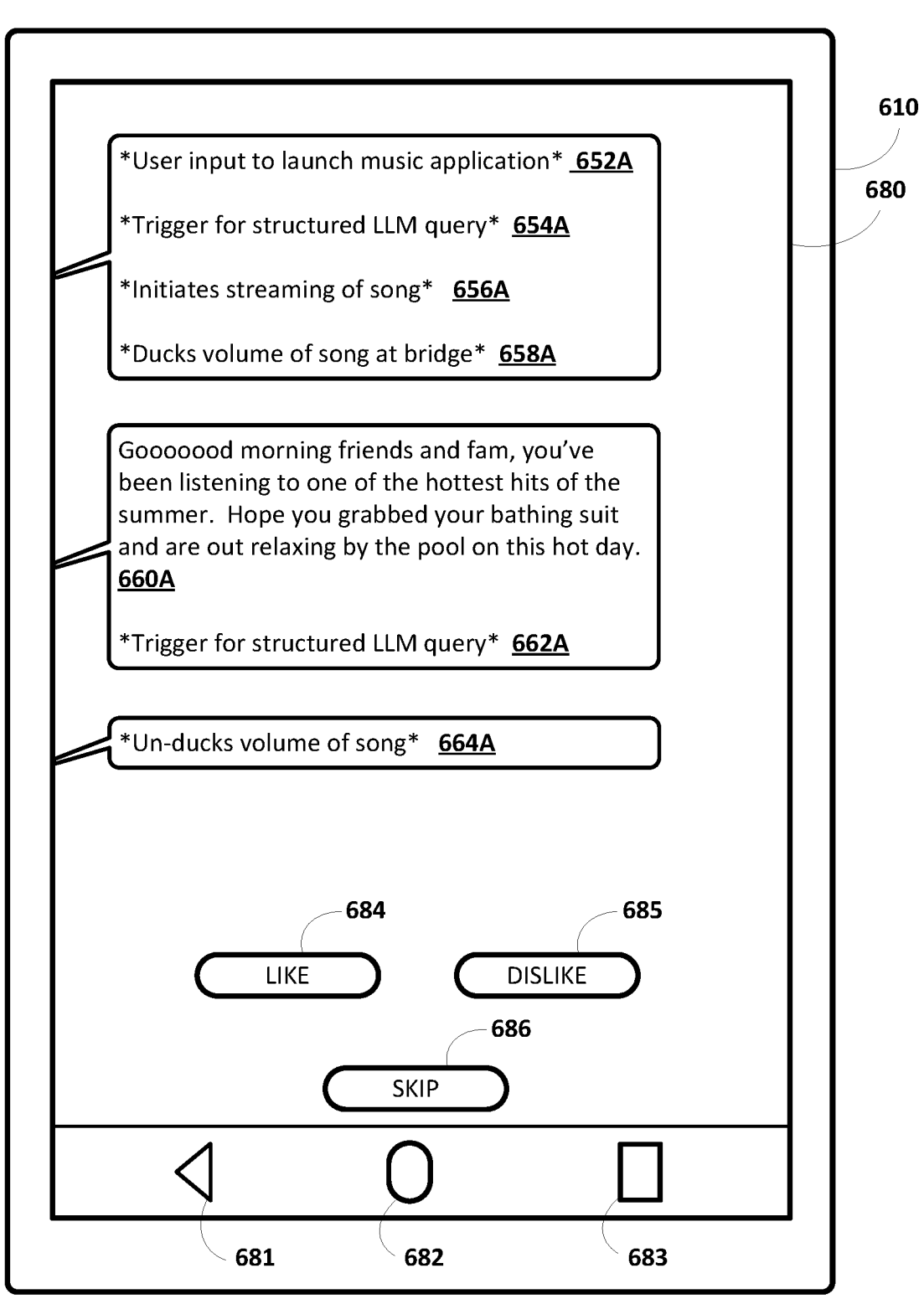

*User input to launch music application* 652A

*Trigger for structured LLM query* 654A

*Initiates streaming of song* 656A

*Ducks volume of song at bridge* 658A

Gooooood morning friends and fam, you've been listening to one of the hottest hits of the summer. Hope you grabbed your bathing suit and are out relaxing by the pool on this hot day. 660A

*Trigger for structured LLM query* 662A

*Un-ducks volume of song* 664A

684
LIKE

685
DISLIKE

686
SKIP

PROACTIVE PERSONALIZATION OF MULTIMEDIA CONTENT AND DIALOG CONTENT THROUGH UTILIZATION OF LARGE LANGUAGE MODEL(S)

BACKGROUND

Various generative models have been proposed that can be used to process natural language (NL) data, contextual data, and/or other data, to generate output that reflects generative content that is responsive to the data. For example, large language models (LLM(s)) have been developed that can be used to process NL content data, contextual data, and/or other data, to generate LLM output that that reflects NL content and/or other content that is responsive to the NL content data, contextual data, and/or other data. For instance, an LLM can be used to process NL data of "play a song for me" and contextual data of a user's music preferences, to generate LLM output that reflects several responsive multimedia media content items that are tailored to the user based on their music preferences. However, current utilizations of generative models suffer from one or more drawbacks.

As one example, many LLMs only generate LLM output in response to receiving explicit NL data from a user, such as a query or prompt that solicits responsive content items. However, for some scenarios, the contextual data may be sufficient to generate the responsive content items and without any explicit NL data. Generating the LLM output in response to receiving explicit NL data from the user can not only result in an increased quantity of inputs being received from the user, but generating the LLM output in response to receiving explicit NL data from the user can also result in increased input lengths being processed by the LLMs, thereby wasting computational resources. Further, generating the LLM output in response to receiving explicit NL data from the user can result in increased latency in ultimately rendering the responsive content items for presentation to the user since the LLMs may not begin processing any of the aforementioned data until the explicit NL data is received from the user, thereby increasing a duration of an interaction between the user and the LLMs.

SUMMARY

Implementations described herein relate to causing a client device to initiate streaming of multimedia content and causing the client device to render dialog content before and/or during the streaming of the multimedia content. Processor(s) can generate a structured large language model (LLM) query that can be processed to generate LLM output. The LLM output can include, for example, an indication of the multimedia content and the dialog content. Notably, the structured LLM query can be generated based on at least contextual data associated with a user. Accordingly, not only can the multimedia content that is streamed at the client device be personalized to the user, but the dialog content that is rendered at the client device before and/or during the streaming of the multimedia content can also be personalized to the user.

For example, assume that the user launches a software application that is capable of streaming multimedia content. In this example, the user launching the software application (or providing other input indicating a desire to initiate the streaming of the multimedia content via the software application) can be initially utilized as a trigger to generate the structured LLM query. Further assume that the processor(s)

generate the structured LLM query and based on at least the contextual data associated with the user, and cause a LLM (e.g., that was previously fine-tuned to handle processing the structured LLM query) to process the structured LLM query to generate the LLM output that includes the indication of the multimedia content and the dialog content. In this example, the contextual data associated with the user can include music preferences of the user, video preferences of the user, sports preferences of the user, news preferences of the user, music or video listening habits of the user, search results associated with the multimedia content, and/or other data. Accordingly, the multimedia content that is streamed at the client device will conform to the preferences of the user and the dialog content will include information about the multimedia content and/or interests of the user, thereby providing a personalized experience in consumption of multimedia content.

In some implementations, the processors(s) can determine when to generate an additional structured LLM query to continue the streaming of the multimedia content, and proactively cause additional LLM output to be generated based on the additional structured LLM query. In some versions of those implementations, the processor(s) can determine to generate the structured LLM query based on completing rendering of the dialog content that was generated based on a previous structured LLM query. For example, in response to the given dialog content that was generated based on the previous structured LLM query being audibly and/or visually rendered for presentation to the user, the processor(s) can determine to generate the additional structured LLM query to proactively obtain subsequent multimedia content and subsequent dialog content. The processor(s) can cause the subsequent multimedia content and the subsequent dialog content to be pre-cached at the client device. This enables the processor(s) to reduce latency in causing the subsequent multimedia content and/or the subsequent dialog content to be rendered at the client device since it is already pre-cached at the client device when they need to be streamed and/or rendered for presentation to the user.

In additional or alternative versions of those implementations, the processor(s) can determine to generate the additional structured LLM query based on a given persona, from among a plurality of disparate personas, that is utilized in generating and/or rendering of the dialog content being changed. For example, the software application that was launched to initiate the streaming of the multimedia content can include settings that enable the user to change the given persona that is utilized in generating and/or rendering of the dialog content. The given persona can be embodied by, for example, a given vocabulary that is specific to the given persona, a given set of prosodic properties that is specific to the given persona and that is utilized in synthesizing the dialog content for audible presentation to the user, and/or a given set of visual cues for a visualized representation of the given persona (e.g., an animated avatar or entity) that includes at least some visual cues that are specific to the given persona and that includes some visual cues that are common amongst multiple personas of the plurality of disparate personas (e.g., waving, certain facial expressions, etc.). By changing the given persona, the user can effectively change information included in the dialog content and/or how the dialog content is rendered. The settings can also enable the user to change music preferences, video preferences, news source preferences, sports team preferences, and/or any other preferences associated with any multimedia content.

In additional or alternative versions of those implementations, the processor(s) can determine to generate the structured LLM query based on receiving an indication that a user of the client device has provided input that dislikes the multimedia content and/or to skip the multimedia content. For example, the software application can include corresponding selectable graphical elements that, when selected, indicates that the user dislikes a song (or other multimedia content) and/or the user desires to skip the song (or the other multimedia content). In this example, the selection of one or more of the corresponding selectable graphical elements can be utilized as a signal to generate the additional structured LLM query.

In additional or alternative implementations, the processor(s) can determine when to cause the dialog content to be rendered with respect to the streaming of the multimedia content. In some versions of those implementations, the processor(s) can identify multimedia content metadata that is associated with the multimedia content. The multimedia content metadata can include, for instance, information associated with the multimedia content, such as a duration of the multimedia content, timestamps for the multimedia content that identify various portions of the multimedia content (e.g., an intro, a bridge, an outro, and/or other portions of the multimedia content), listening and/or viewing metrics associated with the multimedia content (e.g., whether a particular portion of the multimedia content is popular and/or typically listened to or viewed by a threshold quantity of users), and/or any other data associated with the multimedia content. In these implementations, the processor(s) can determine, based on the multimedia content metadata that is associated with the multimedia content and based on the dialog content, when to render the given dialog content at the client device and with respect to the streaming of the given multimedia content.

For example, the processor(s) may typically determine to render the given dialog content during an intro portion of the multimedia content in an attempt to utilize the dialog content to introduce the multimedia content. In some of these examples, listening and/or viewing metrics associated with the multimedia content may indicate that the intro portion of the given multimedia content is the most popular portion of the multimedia content. Accordingly, in these examples, the processor(s) may determine to render the dialog content during a bridge portion of the multimedia content or an outro portion of the multimedia content, and instead of the intro portion of the multimedia content. In other of these examples, a duration needed to audibly render the dialog content may exceed a duration of the intro portion of the multimedia content such that the audibly rendering of the dialog content would overlap with spoken words included in the multimedia content. Accordingly, in these examples, the processor(s) may also determine to render the dialog content during the bridge portion of the multimedia content or the outro portion of the multimedia content, and instead of the intro portion of the multimedia content.

In additional or alternative versions of those implementations, the processor(s) can determine, based on content included in the dialog content, when to render the dialog content at the client device and with respect to the streaming of the multimedia content. As noted above, the dialog content may not only include information related to the given multimedia content, but may also include other information, such as information from various news sources or related to various sports teams. In these instances, the content may include noteworthy information, such as breaking news stories or sports stories. Accordingly, in these instances, the processor(s) can determine to render the dialog content immediately to convey the breaking news stories or sports stories regardless of the multimedia content metadata. In this manner, the processor(s) can proactively provide information for presentation to the user in a timely manner when appropriated.

In some implementations, the software application can be a first-party software application, whereas in other implementations, the software application can be a third-party application. As used herein, the term "first-party" is associated with a first-party entity that manages and/or hosts the LLM described herein, whereas the term "third-party" is associated with a third-party entity that is a distinct entity from the first-party entity that manages and/or hosts the LLM. Accordingly, in implementations where the software application is a third-party software application, the first-party entity can provide the LLM and/or the personalization of the multimedia content and/or the dialog content as a service to the third-party.

The above description is provided as an overview of only some implementations disclosed herein. Those implementations, and other implementations, are described in additional detail herein. Further, it should be understood that techniques disclosed herein can be implemented locally on a client device, remotely by server(s) connected to the client device via one or more networks, and/or both.

BRIEF DESCRIPTION OF THE DRAWINGS

FIG. 4 depicts a flowchart illustrating an example method of determining when to cause a client device to render dialog content with respect to a stream of multimedia content being streamed at the client device, in accordance with various implementations.

FIG. 6A and FIG. 6B depict various non-limiting examples of determining when to cause a client device to render dialog content with respect to a stream of multimedia content being streamed at the client device, in accordance with various implementations.

DETAILED DESCRIPTION

Figure 1:
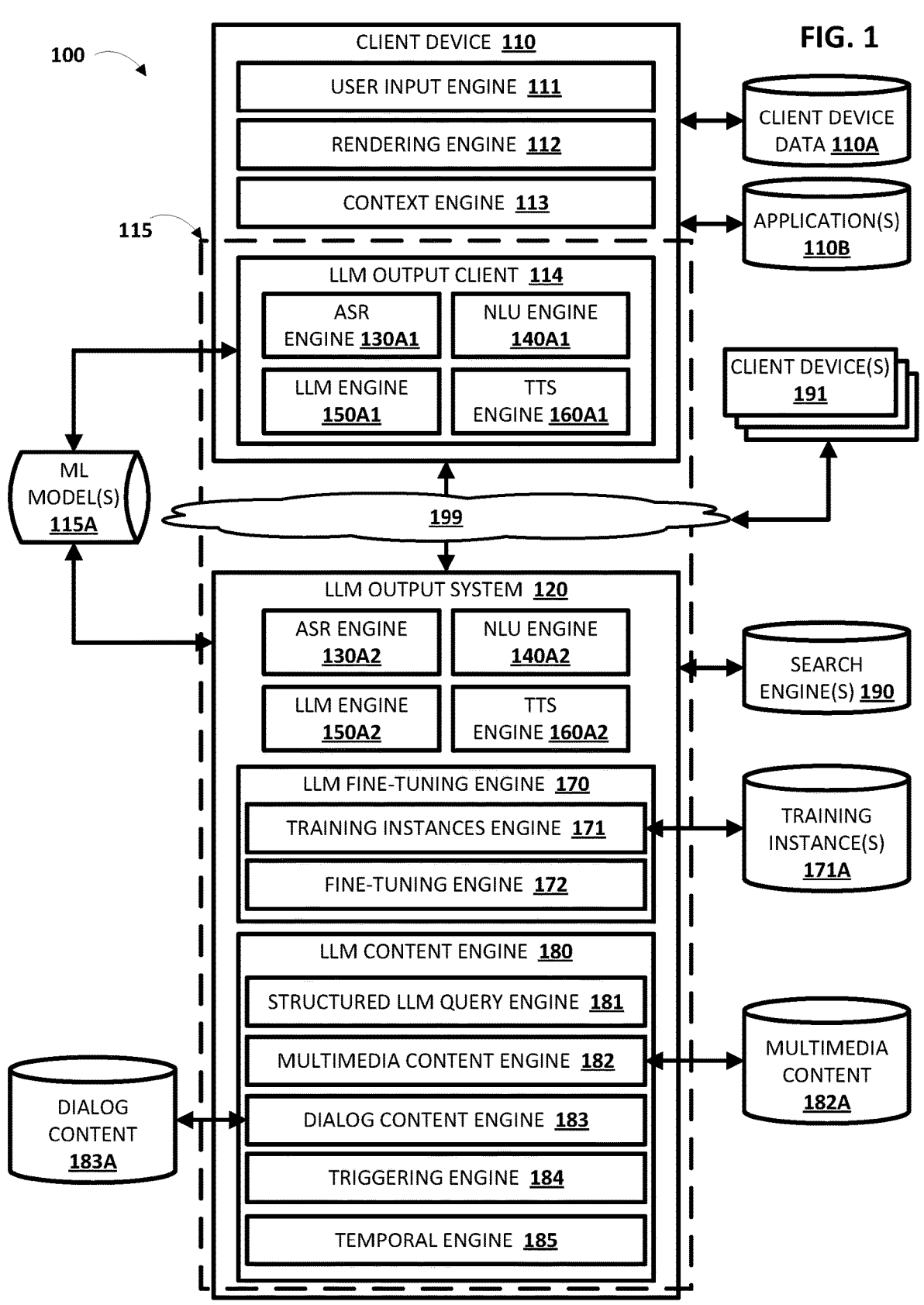
FIG. 1 depicts a block diagram of an example environment that demonstrates various aspects of the present disclosure, and in which implementations disclosed herein can be implemented.

Turning now to FIG. 1, a block diagram of an example environment 100 that demonstrates various aspects of the present disclosure, and in which implementations disclosed herein can be implemented is depicted. The example environment 100 includes a client device 110 and a large language model (LLM) output system 120. In some implementations, the LLM output system 120 can be implemented locally at the client device 110. In additional or alternative implementations, the LLM output system 120 can be implemented remotely from the client device 110 as depicted in FIG. 1 (e.g., at remote server(s)). In these implementations, the client device 110 and the LLM output system 120 may be communicatively coupled with each other via one or more networks 199, such as one or more wired or wireless local area networks ("LANs," including Wi-Fi LANs, mesh networks, Bluetooth, near-field communication, etc.) or wide area networks ("WANs", including the Internet).

The client device 110 may be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device). Additional and/or alternative client devices may be provided.

The client device 110 can execute an LLM output client 114. An instance of the LLM output client 114 can be an application that is separate from an operating system of the client device 110 (e.g., installed "on top" of the operating system)—or can alternatively be implemented directly by the operating system of the client device 110. The LLM output client 114 can interact with the LLM output system 120 implemented locally at the client device 110 or via one or more of the networks 199 as depicted in FIG. 1. The LLM output client 114 (and optionally by way of its interactions with other remote system (e.g., server(s)) may form what appears to be, from a user's perspective, a logical instance of chatbot 115 that leverages the capabilities of an LLM and with which the user may optionally engage in a human-to-computer dialog. An instance of the chatbot 115 is depicted in FIG. 1, and is encompassed by a dashed line that includes the LLM output client 114 of the client device 110 and the LLM output system 120. It thus should be understood that a user that engages with the LLM output client 114 executing on the client device 110 may, in effect, engage with his or her own logical instance of the chatbot 115 (or a logical instance of the chatbot 115 that is shared amongst a household or other group of users). For the sake of brevity and simplicity, the chatbot 115 as used herein will refer to the LLM output client 114 executing locally on the client device 110 and/or executing remotely at one or more remote servers that may implement the LLM output system 120.

In various implementations, the client device 110 may include a user input engine 111 that is configured to detect natural language (NL) based input provided by a user of the client device 110 and/or other user inputs using one or more user interface input devices. For example, the client device 110 may be equipped with one or more microphones that capture audio data, such as audio data corresponding to spoken utterances of the user or other sounds in an environment of the client device 110. Additionally, or alternatively, the client device 110 may be equipped with one or more vision components that are configured to capture vision data corresponding to images and/or movements (e.g., gestures) detected in a field of view of one or more of the vision components. Additionally, or alternatively, the client device 110 may be equipped with one or more touch sensitive components (e.g., a keyboard and mouse, a stylus, a touch screen, a touch panel, one or more hardware buttons, etc.) that are configured to capture signal(s) corresponding to touch input directed to the client device 110. However, it should be understood that, in various implementations, NL based input is not required to leverage the capabilities of the chatbot 115.

In various implementations, the client device 110 may include a rendering engine 112 that is configured to render content for audible and/or visual presentation to a user of the client device 110 using one or more user interface output devices. For example, the client device 110 may be equipped with one or more speakers that enable content to be provided for audible presentation to the user via the client device 110. Additionally, or alternatively, the client device 110 may be equipped with a display or connected to another client device that includes a display or projector that enables content to be provided for visual presentation to the user via the client device 110.

In various implementations, the client device 110 may include a context engine 113 that is configured to determine a context (e.g., current or recent context) of the client device 110, of a user of the client device 110 (e.g., an active user of the client device 110 when the client device 110 is associated with multiple users), and/or of a multimedia content session. In some of those implementations, the context engine 113 can determine a context based on data stored in client device data database 110A. The data stored in the client device data database 110A can include, for example, user interaction data that characterizes current or recent interaction(s) of the client device 110 and/or recent interaction(s) of a user with the client device 110, location data that characterizes a current or recent location(s) of the client device 110 and/or recent location(s) of a user of the client device 110, user attribute data that characterizes one or more attributes of a user of the client device 110, user preference data that characterizes one or more preferences of a user of the client device 110, user profile data that characterizes a profile of a user of the client device 110, and/or any other data accessible to the context engine 113. For example, the context engine 113 can determine a current context based on a current state of a multimedia content session (e.g., considering recently provided multimedia content), profile data, and/or a current location of the client device 110. A context determined by the context engine 113 can be utilized, for example, in supplementing or rewriting NL based input detected at the client device 110 (e.g., via the user input engine 111), or in lieu of any NL based input.

Further, the client device 110 and/or the LLM output system 120 may include one or more memories for storage of data and/or software applications, one or more processors for accessing data and executing the software applications, and/or other components that facilitate communication over one or more of the networks 199. In some implementations, one or more of the software applications can be installed locally at the client device 110, whereas in other implementations one or more of the software applications can be hosted remotely (e.g., by one or more servers as indicated by 110B) and can be accessible by the client device 110 over one or more of the networks 199.

In some implementations, the operations performed by the chatbot 115 may be implemented locally at the client device 110 via the LLM output client 114. As shown in FIG. 1, the LLM output client 114 may include an automatic speech recognition (ASR) engine 130A1, a natural language understanding (NLU) engine 140A1, a large language model (LLM) engine 150A1, and a text-to-speech (TTS) engine 160A1. In some implementations, the operations performed by the chatbot 115 may be distributed across multiple computer systems, such as when the LLM output system 120 is implemented remotely from the client device 110 as depicted in FIG. 1. In these implementations, the chatbot 115 may additionally or alternatively utilize ASR engine 130A2, NLU engine 140A2, LLM engine 150A2, and TTS engine 160A2 of the LLM output system 120.

Each of these engines may be configured to perform one or more functions. For example, the ASR engine 130A1 and/or 130A2 can process, using ASR model(s) stored in machine learning (ML) model(s) database 115A (e.g., a recurrent neural network (RNN) model, a transformer model, and/or any other type of ML model capable of performing ASR), any streams of audio data that capture spoken utterance(s) as NL based input and that is generated by microphone(s) of the client device 110 to generate ASR output. Notably, in some implementations, the ASR model can be utilized to generate the ASR output as the audio data is generated (e.g., a streaming ASR model). Further, the NLU engine 140A1 and/or 140A2 can process, using NLU model(s) stored in the ML model(s) database 115A (e.g., a long short-term memory (LSTM), gated recurrent unit (GRU), and/or any other type of RNN or other ML model capable of performing NLU) and/or grammar-based rule(s), the ASR output, other NL based input (such as typed input), and/or a context to generate NLU output (e.g., determined by the context engine 113). Moreover, the chatbot 115 can cause the NLU output to be processed to generate fulfillment output. For instance, the chatbot 115 can transmit one or more structured request to one or more first-party (1P) systems and/or one or more third-party (3P) systems, and receive fulfillment output from one or more of the 1P systems and/or 3P systems to generate the fulfillment output. The one or more structured requests can be generated based on, for example, the NLU output, and the fulfillment output can correspond to, for example, multimedia content, dialog content, and/or other content that is responsive to the NLU output.

Moreover, the TTS engine 160A1 and/or 160A2 can process, using TTS model(s) stored in the ML model(s) database 115A, dialog content (e.g., text formulated by the chatbot 115 through utilization of an LLM) to generate synthesized speech audio data that includes computer-generated synthesized speech capturing the dialog content. In implementations where the TTS engine 160A1 and/or 160A2 is utilized to process the dialog content, the TTS engine 160A1 and/or 160A2 can generate the synthesized speech using one or more prosodic properties to reflect different personas as described herein. Notably, the ML model(s) stored in the ML model(s) database 115A can be on-device ML models that are stored locally at the client device 110 or shared ML models that are accessible to both the client device 110 and/or remote systems when the LLM output system 120 is not implemented locally at the client device 110.

In various implementations, the ASR output can include, for example, speech hypotheses (e.g., term hypotheses and/or transcription hypotheses) that are predicted to correspond to spoken utterance(s) of a user that are captured in the audio data, one or more corresponding predicted values (e.g., probabilities, log likelihoods, and/or other values) for each of the speech hypotheses, a plurality of phonemes that are predicted to correspond to spoken utterance(s) of a user that are captured in the audio data, one or more corresponding predicted values (e.g., probabilities, log likelihoods, and/or other values) for each of the plurality of phonemes, and/or other ASR output. In some versions of those implementations, the ASR engine 130A1 and/or 130A2 can select one or more of the speech hypotheses as recognized text that corresponds to the spoken utterance(s) (e.g., based on the corresponding predicted values for each of the speech hypotheses), such as when the ASR engine 130A1 and/or 130A2 utilizes an end-to-end ASR model. In other implementations, the ASR engine 130A1 and/or 130A2 can select one or more of the predicted phonemes (e.g., based on the corresponding predicted values for each of the predicted phonemes), and determine recognized text that corresponds to the spoken utterance(s) based on the one or more predicted phonemes that are selected, such as when the ASR engine 130A1 and/or 130A2 utilizes an ASR model that is not end-to-end. In these implementations, the ASR engine 130A1 and/or 130A2 can optionally employ additional mechanisms (e.g., a directed acyclic graph) to determine the recognized text that corresponds to the spoken utterance(s) based on the one or more predicted phonemes that are selected.

In various implementations, the NLU output can include, for example, annotated recognized text that includes one or more annotations of the recognized text for one or more (e.g., all) of the terms of the recognized text. For example, the NLU engine 140A1 and/or 140A2 may include a part of speech tagger (not depicted) configured to annotate terms with their grammatical roles. Additionally, or alternatively, the NLU engine 140A1 and/or 140A2 may include an entity tagger (not depicted) configured to annotate entity references in one or more segments of the recognized text, such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. The entity tagger may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

Additionally, or alternatively, the NLU engine 140A1 and/or 140A2 may include a coreference resolver (not depicted) configured to group, or "cluster," references to the same entity based on one or more contextual cues. For example, the coreference resolver may be utilized to resolve the term "them" to "buy theatre tickets" in the NL based input "buy them", based on "theatre tickets" being mentioned in a client device notification rendered immediately prior to receiving input "buy them". In some implementations, one or more components of the NLU engine 140A1 and/or 140A2 may rely on annotations from one or more other components of the NLU engine 140A1 and/or 140A2. For example, in some implementations the entity tagger may rely on annotations from the coreference resolver in annotating all mentions to a particular entity. Also, for example, in some implementations, the coreference resolver may rely on annotations from the entity tagger in clustering references to the same entity.

As described herein, the chatbot 115 can additionally, or alternatively, utilize a LLM (e.g., stored in the ML model(s) database 115A) in generating a NL based response that is responsive to the NL based input. For example, the NLU engine 140A1 and/or 140A2 can optionally be omitted, and the LLM engine 150A1 and/or 150A2 can be utilized to process the recognized text generated by the ASR engine 130A1 and/or 130A2, contextual data obtained and/or generated by the context engine 113, and/or other data. Also, for example, in implementations where the NL based input is non-speech based (e.g., the NL based input is typed input), the ASR engine 130A1 and/or 130A2 and the NLU engine 140A1 and/or 140A2 can optionally be omitted, and the LLM engine 150A1 and/or 150A2 can be utilized to process contextual data obtained and/or generated by the context engine 113. Accordingly, it should be understood that the LLM engine 150A1 and/or 150A2 can be implemented independent of any output generated by various other engines depicted in FIG. 1 (e.g., independent of any ASR output generated using the ASR engine 130A1 and/or 130A2 and/or independent of any NLU output generated using the NLU engine 140A1 and/or 140A2).

As depicted in FIG. 1, the LLM output system 120 can include a LLM fine-tuning engine 170 and a LLM content engine 180. These various engines of the LLM output system 120 can include sub-engines. For example, the LLM fine-tuning engine 170 can include a training instances engine 171 and a fine-tuning engine 172. Also, for example, the LLM content engine 180 can include a structured LLM query engine 181, a multimedia content engine 182, a dialog content engine 183, a triggering engine 184, and a temporal engine 185. Although particular engines and sub-engines are depicted in FIG. 1, it should be understood that is for the sake of example and to illustrate aspects of techniques described herein, and is not meant to be limiting. For example, various engine and/or sub-engines can be added, combined, and/or omitted.

As described herein, the client device 110 and/or the LLM output system 120 can be utilized to cause the client device 110 to initiate streaming of multimedia content and cause the client device 110 to render dialog content before and/or during the streaming of the multimedia content. The LLM content engine 180 can generate a structured LLM query that can be processed (e.g., by the LLM engine 150A1 and/or 150A2) to generate LLM output. The LLM output can include, for example, an indication of the multimedia content to be streamed and the dialog content to be rendered before and/or during the streaming of the multimedia content. In some implementations, the processors(s) can determine when to generate an additional structured LLM query to continue the streaming of the multimedia content, and proactively cause additional LLM output to be generated based on the additional structured LLM query (e.g., as described with respect to FIGS. 3, 5A, and 5B). In additional or alternative implementations, the processor(s) can determine when to cause the dialog content to be rendered with respect to the streaming of the multimedia content (e.g., as described with respect to FIGS. 4, 6A, and 6B). Notably, in various implementations, the LLM content engine 180 can generate the structured LLM query independent of any explicit NL based input to generate the structured LLM query. Rather, the LLM content engine 180 can generate the structured LLM query based on contextual data obtained and/or generated by the context engine 113. The LLM content engine 180 is described in more detail herein (e.g., with respect to FIGS. 2, 3, 4, 5A, 5B, 6A, and 6B). However, and prior to the structured LLM query being processed, the LLM fine-tuning engine 170 can fine-tune an LLM (e.g., stored in the ML model(s) database 115A) based on a plurality of training instances. By fine-tuning the LLM based on the plurality of training instances, the LLM is effectively trained to generate the LLM output that includes the indication of the multimedia content to be streamed and the dialog content to be rendered before and/or during the streaming of the multimedia content.

For example, the LLM fine-tuning engine 170 can identify an LLM (e.g., stored in the ML model(s) database 115A) that is to be fine-tuned. The LLM that is identified can include, for example, any LLM that is stored in the LLM(s) database 141A, such as PaLM, BARD, BERT, LaMDA, Meena, GPT, and/or any other LLM, such as any other LLM that is encoder-only based, decoder-only based, sequence-to-sequence based and that optionally includes an attention mechanism or other memory. Notably, the LLM can include billions of weights and/or parameters that are learned through training the LLM on enormous amounts of diverse data. This enables the LLM (e.g., prior to fine-tuning) to generate the LLM output as the probability distribution over a sequence of tokens and based on processing NL based input, contextual data, and/or other data.

Further, the training instances engine 171 can obtain (e.g., from training instance(s) database 171A) and/or generate a plurality of training instances. Each of the training instances can include a corresponding structured LLM query, and corresponding multimedia content and corresponding dialog content that is associated with the corresponding structured LLM query. For instance, a given training instance, of the plurality of training instances, can include contextual data that characterizes music preferences of a user, corresponding multimedia content (e.g., a song that conforms to the music preferences) that satisfies the music preferences of the user, and corresponding dialog content that provides commentary on the corresponding multimedia content (e.g., commentary on the song). As another example, a given training instance, of the plurality of training instances, can include contextual data that characterizes sports or news preferences of a user, corresponding multimedia content (e.g., information related to a particular sports teams or particular news sources that conforms to the sports or news preferences) that satisfies the sports or news preferences of the user, and corresponding dialog content that provides commentary on the corresponding multimedia content (e.g., commentary on the particular sports team or updated news stories from the particular news source).

Although the above examples include the multimedia content being a song and information related to a particular sports teams or particular news sources, it should be understood that is for the sake of example and is not meant to be limiting. Rather, it should be understood that the multimedia content described here can include any type of content that uses one or more text, images, audio, and/or video to convey information to a user for one or more purposes. As some non-limiting examples, the multimedia content can be for entertainment purposes, such as songs, music videos, trivia, podcasts, animations, sports news, world news, local news, and/or other multimedia content that can be provided for entertainment purposes; education purposes, such as lectures, presentations, webinars, and/or other multimedia content that can be provided for education purposes; and/or for other purposes.

Moreover, the fine-tuning engine 172 can cause the identified LLM to be fine-tuned based on the plurality of training instances to generate a fine-tuned LLM, and can cause the fine-tuned LLM to be stored in the ML model(s) database 115A. By generating the fine-tuned LLM based on the plurality of training instances, the fine-tuned LLM is able to process at least contextual data to generate the LLM output that includes the indication of given multimedia content to be streamed at the client device and the corresponding dialog content to be rendered at the client device and with respect to the multimedia content. As described in more detail herein (e.g., with respect to FIGS. 2, 3, 4, 5A, 5B, 6A, and 6B), the fine-tuned LLM is able to generate the LLM output without having to process any explicit NL based input provided by a user. Thus, the fine-tuned LLM is able to proactively generate the LLM output, thereby reducing latency in causing the given multimedia content to be streamed and/or the given dialog content to be rendered, since this information can be pre-cached locally at the client device 110.

Although FIG. 1 is described with respect to a single client device having a single user, it should be understood that is for the sake of example and is not meant to be limiting. For example, one or more additional client devices of a user or other users (e.g., client device(s) 191) can also implement the techniques described herein. For instance, the client device 110, the one or more additional client devices, and/or any other computing devices of the user can form an ecosystem of devices that can employ techniques described herein. These additional client devices and/or computing devices may be in communication with the client device 110 (e.g., over the network(s) 199). As another example, a given client device can be utilized by multiple users in a shared setting (e.g., in a household environment, in an enterprise or work environment, in a hospitality environment, etc.).

Figure 2:
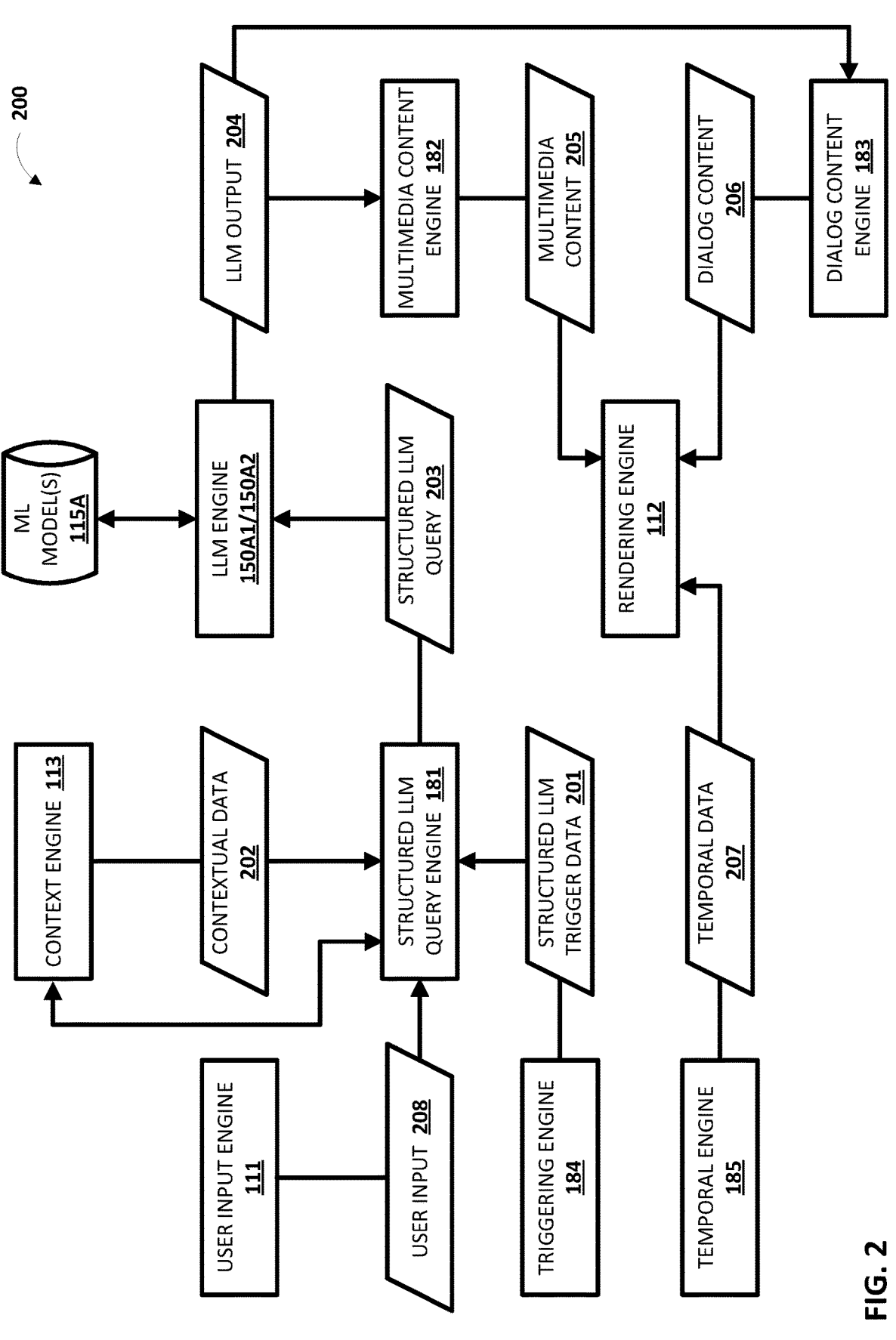
FIG. 2 depicts an example process flow of utilizing a large language model (LLM) to cause a client device to stream multimedia content and to render dialog content before and/or during the streaming of the multimedia content, in accordance with various implementations.

Turning now to FIG. 2, an example process flow 200 of utilizing a large language model (LLM) to cause a client device to stream multimedia content and to render dialog content before and/or during the streaming of the multimedia content is depicted. For the sake of example, assume that the triggering engine 184 determines to generate a structured LLM query to initiate streaming of multimedia content at the client device 110 and/or to continue streaming of the multimedia content at the client device 110. The triggering engine 184 can generate structured LLM trigger data 201 that initiates generation of a structured LLM query. For instance, and as shown in FIG. 2, the triggering engine 184 can provide the structured LLM trigger data 201 to the structured LLM query engine 181, and the structured LLM query engine 181 can cause the context engine 113 to provide contextual data 202 to the structured LLM query engine 181. Additionally, or alternatively, the triggering engine 184 can provide the structured LLM trigger data 201 directly to the context engine 113 to cause the context engine 113 to provide contextual data 202 to the structured LLM query engine 181.

The triggering engine 184 can determine to generate a structured LLM query to initiate streaming of multimedia content at the client device 110 and/or to continue streaming of the multimedia content at the client device 110 based on various signals. In some implementations, the triggering engine 184 can determine to generate the structured LLM query based on a software application capable of streaming the multimedia content being launched and/or user input directed to the software application to initiate streaming of the multimedia content being received. In some versions of those implementations, the software application can be a first-party software application, whereas in other versions of those implementations, the software application can be a third-party application. As used herein, the term "first-party" is associated with a first-party entity that manages and/or hosts the LLM output system 120, whereas the term "third-party" is associated with a third-party entity that is a distinct entity from the first-party entity that manages and/or hosts the LLM output system 120. Accordingly, in versions of those implementations where the software application is a third-party software application, the first-party entity can provide the LLM output system 120 as a service to the third-party.

In additional or alternative implementations, the triggering engine 184 can determine to generate the structured LLM query based on completing rendering of given dialog content that was generated based on a previous structured LLM query. For example, in response to the given dialog content that was generated based on the previous structured LLM query being audibly and/or visually rendered for presentation to the user, the triggering engine 184 can determine to generate the structured LLM query to proactively obtain subsequent given multimedia content and subsequent given dialog content. The subsequent given multimedia content and the subsequent given dialog content can be pre-cached at the client device 110. This enables the LLM output system 120 to reduce latency in causing the subsequent given multimedia content and/or the subsequent given dialog content to be rendered at the client device 110 since it is already pre-cached at the client device 110 when they need to be streamed and/or rendered for presentation to the user.

In additional or alternative implementations, the triggering engine 184 can determine to generate the structured LLM query based on a given persona, from among a plurality of disparate personas, that is utilized in generating and/or rendering of the dialog content being changed. For example, the streaming of the multimedia content and the rendering of the dialog content can be performed via a software application. The software application can include settings that enable the user to change the given persona that is utilized in generating and/or rendering of the dialog content. The given persona can be embodied by, for example, a given vocabulary that is specific to the given persona, a given set of prosodic properties that is specific to the given persona and that is utilized in synthesizing the given dialog content for audible presentation to the user, and/or a given set of visual cues for a visualized representation of the given persona (e.g., an animated avatar or entity) that includes at least some visual cues that are specific to the given persona and that includes some visual cues that are common amongst multiple personas of the plurality of disparate personas (e.g., waving, certain facial expressions, etc.). By changing the given persona, the user can effectively change the given dialog content and/or how the chatbot 115 provides the given dialog content. The settings can also enable the user to change music preferences, video preferences, news source preferences, sports team preferences, and/or any other preferences associated with any multimedia content.

In additional or alternative implementations, the triggering engine 184 can determine to generate the structured LLM query based on receiving an indication that a user of the client device 110 has provided input that dislikes the given multimedia content and/or to skip the given multimedia content (e.g., detected via the user input engine 111 and indicated by the user input 208). For example, the streaming of the multimedia content and the rendering of the dialog content can be performed via a software application. The software application can include corresponding selectable graphical elements that, when selected, indicates that the user dislikes a song (or other multimedia content) and/or the user desires to skip the song (or the other multimedia content). In this example, the selection of one or more of the corresponding selectable graphical elements can be utilized as a signal to generate the structured LLM query.

As noted above, and in response to the triggering engine 184 determining to generate a structured LLM query to initiate streaming of multimedia content at the client device 110 and/or to continue streaming of the multimedia content at the client device 110, the context engine 113 can provide the contextual data 202 to the structured LLM query engine 181, and the structured LLM query engine 181 can generate a structured LLM query 203 based on at least the contextual data 202. The contextual data 202 can include, for example, contextual data associated with a user of the client device 110, such as music preferences of the user of the client device 110, sports and/or sports team preferences of the user of the client device 110, news and/or news source preferences of the user of the client device 110, recent location(s) of the user of the client device 110, recent interaction(s) of the user of the client device 110; contextual data associated with the client device 110 itself, such as a time of day at a current location of the client device 110, a day of week at a current location of the client device 110, a season of the year at a current location of the client device 110, and/or other contextual data associated with the client device 110; and/or any other contextual data.

Further, the structured LLM query engine 181 can provide the structured LLM query 203 to the LLM engine 150A1 and/or 150A2. The LLM engine 150A1 and/or 150A2 can process, using an LLM stored in the ML model(s) database 115A (e.g., the LLM that is fine-tuned as described above with respect to FIG. 1), the structured LLM query 203 to generate LLM output 204. The LLM output 204 can include, for example, an indication of given multimedia content to be streamed at the client device 110 and given dialog content to be rendered at the client device 110. Accordingly, the multimedia content engine 182 can utilize the LLM output 204 determine the multimedia content 205 to be streamed at the client device 110, and the dialog content engine 183 can utilize the LLM output 204 to determine the dialog content 206 to be rendered at the client device 110.

In some implementations, the multimedia content engine 182 can establish (or continue) a communication session with a multimedia content service provider. For example, and assuming that the indication of the multimedia content included in the LLM output 204 is a song, the multimedia content engine 182 can establish (or continue) the communication session with a music streaming service provider (e.g., a first-party music streaming service provider or a third-party music streaming service provider), and can provide the music streaming service provider with the indication of the song to be played, thereby causing the song to be streamed at the client device 110 (e.g., via the rendering engine 112). Notably, whether the multimedia content 205 is audibly and/or visually streamed may be based on a type of the multimedia content 205 (e.g., whether the multimedia content 205 is audio-only, visual-only, both, etc.) and/or based on client device capabilities of the client device 110 (e.g., whether the client device 110 is equipped with speaker(s), a display, etc.).

In some implementations, such as when the indication of the dialog content 206 included in the LLM output 204 is textual dialog content, the dialog content engine 183 can cause the TTS engine(s) 160A1 and/or 160A2 to process, using TTS model(s) stored in the ML model(s) database 115A, the textual dialog content to generate synthesized speech audio data that captures synthesized speech corresponding to the textual dialog content. The synthesized speech audio data can be utilized as the dialog content 206 to be rendered at the client device 110. In some versions of those implementations, the TTS model(s) can utilize one or more prosodic properties associated with the given persona in generating the synthesized speech audio data. Notably, whether the dialog content 206 is audibly and/or visually rendered may be based on client device capabilities of the client device 110 (e.g., whether the client device 110 is equipped with speaker(s), a display, etc.).

Moreover, the temporal engine 185 can leverage multimedia content metadata associated with the multimedia content 205 to determine when, with respect to the streaming of the multimedia content 205, to render the dialog content 206. Based on determining when to render the dialog content 206, the temporal engine 185 can generate temporal data 207, and provide the temporal data 207 to the rendering engine 112 for utilization in causing the dialog content 206 to be rendered at the client device 110 at a time indicated by the temporal data (e.g., and as described in more detail with respect to FIGS. 4, 6A, and 6B).

Although the process flow 200 of FIG. 2 is depicted as including a particular flow, it should be understood that is for the sake of example to illustrate various aspects of the LLM content engine 180 and is not meant to be limiting.

Figure 3:
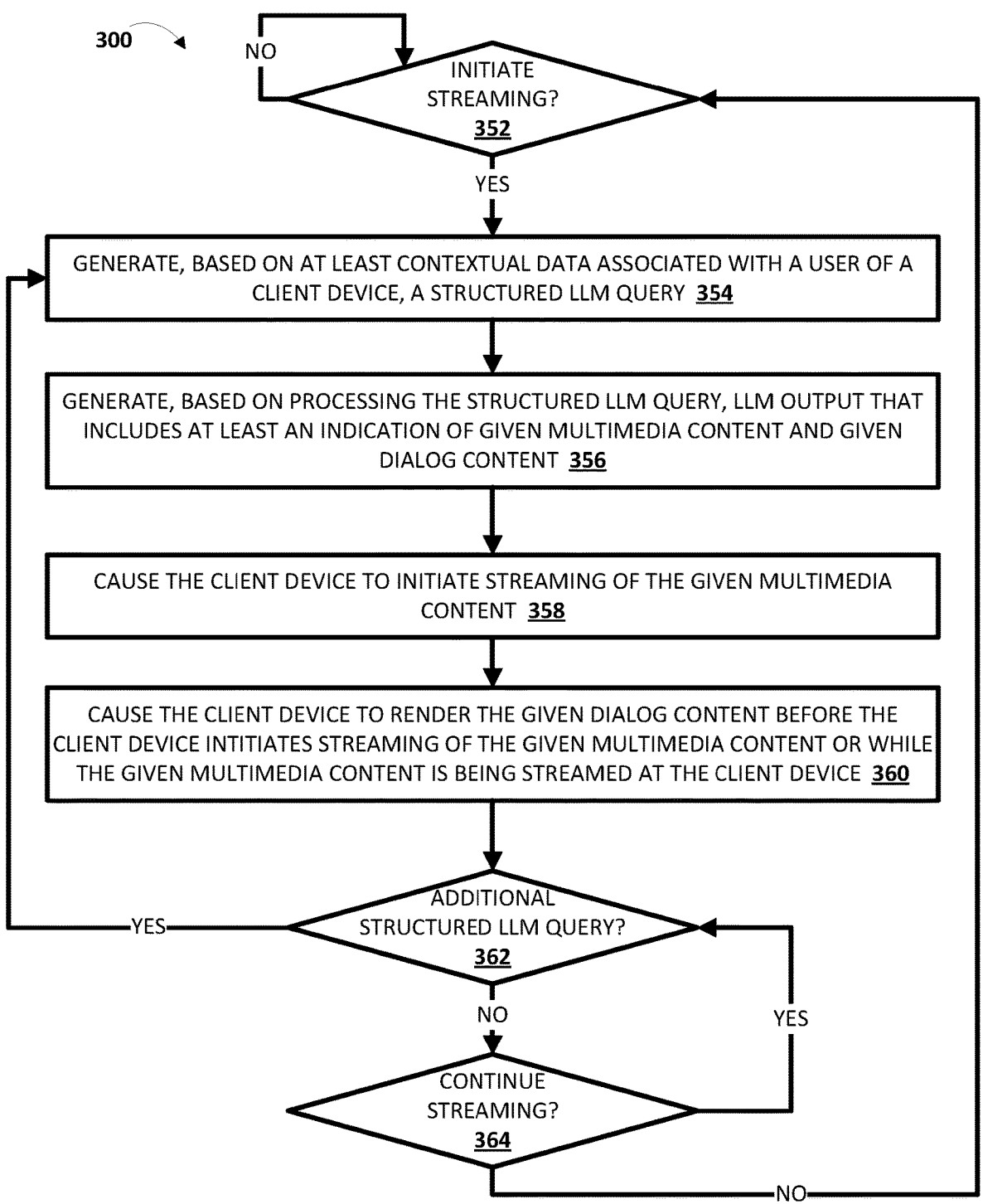
FIG. 3 depicts a flowchart illustrating an example method of determining when to generate structured large language model (LLM) queries, in accordance with various implementations.

Turning now to FIG. 3, a flowchart illustrating an example method 300 of determining when to generate structured large language model (LLM) queries is depicted. For convenience, the operations of the method 300 are described with reference to a system that performs the operations. This system of the method 300 includes one or more processors, memory, and/or other component(s) of computing device(s) (e.g., client device 110 of FIG. 1, LLM output system 120 of FIG. 1, client device 510 of FIGS. 5A and 5B, client device 610 of FIGS. 6A and 6B, computing device 710 of FIG. 7, one or more servers, and/or other computing devices). Moreover, while operations of the method 300 are shown in a particular order, this is not meant to be limiting. One or more operations may be reordered, omitted, and/or added.

At block 352, the system determines whether to initiate streaming of multimedia content at a client device. The system can determine whether to initiate the streamlining of the multimedia content at the client device based on, for example, receiving an indication of user input to initiate streaming of multimedia content at the client device. For instance, the indication of the user input can be based on the user accessing a software application (e.g., a first-party software application or a third-party software application) that is capable of streaming multimedia content, directing user input to the software application to initiate the streaming of the multimedia content after the software application has already been accessed, providing a voice command to initiate the streaming of the multimedia content, and/or received in other manners. If, at an iteration of block 352, the system determines not to initiate the streaming of the multimedia content at the client device, then the system can continue monitoring for whether to initiate the streaming of the multimedia content at the client device at block 352. If, at an iteration of block 352, the system determines to initiate the streaming of the multimedia content at the client device, then the system can proceed to block 354.

At block 354, the system generates, based on at least contextual data associated with a user of a client device, a structured LLM query. For example, the system can obtain and/or generate contextual data that is associated with the user of the client device, the client device itself, and/or other contextual data. Based on the contextual data, the system can generate the structured LLM query by transforming the contextual data into a structured format that can be processed by an LLM (e.g., the LLM that is fine-tuned as described above with respect to FIG. 1). At block 356, the system generates, based on processing the structured LLM query, LLM output that includes an indication of given multimedia content and given dialog content. For example, the system can process, using the LLM, the structured LLM query to generate LLM output that includes the indication of the given multimedia content and the given dialog content (e.g., as described with respect to the process flow of FIG. 2).

At block 358, the system causes the client device to initiate streaming of the given multimedia content. At block 360, the system causes the client device to render the given dialog content before the client device initiates streaming of the given multimedia content or while the given multimedia content is being streamed at the client device. Notably, in some implementations, the system can cause the client device to render the given dialog content before the client device initiates streaming of the given multimedia content, whereas in other implementations, the system can cause the client device to render the given dialog content while the given multimedia content is being streamed at the client device. In these latter implementations, and as described with respect to FIG. 4, the system can cause the client device to duck a volume of the given multimedia content while the given dialog content is being rendered.

At block 362, the system determines whether to generate an additional structured LLM query. The system can determine whether to generate the additional structured LLM query based on various signals (e.g., as described with respect to the triggering engine 184 in the process flow 200 of FIG. 2). If, at an iteration of block 362, the system determines to generate the additional structured LLM query, then the system can return to block 354 continue with the method 300 through additional iterations of blocks 354-362. If, at an iteration of block 362, the system determines to not generate the additional structured LLM query, then the system can proceed to block 364. At block 364, the system determines whether to continue the streaming of the multimedia content. The system can determine to continue the streaming of the multimedia content until an indication of additional user input is received to halt the streaming of the multimedia content and/or the rendering of the dialog content. The indication of the additional user input to halt the streaming of the multimedia content and/or the rendering of the dialog content can include, for example, the user closing the software application, the user providing a voice command to halt the streaming of the multimedia content and/or the rendering of the dialog content, and/or in other manners.

If, at an iteration of block 364, the system determines to continue the streaming of the multimedia content, then the system can return to block 362 to again determine whether to generate the additional structured LLM query. If, at an iteration of block 364, the system determines not to continue the streaming of the multimedia content, then the system can return to block 352 to again determine whether to streaming of multimedia content at a client device.

Notably, in continuing with the method 300 at block 354 and from block 362, the system can generate an additional structured LLM query based on additional contextual data. The additional contextual data can include the indication of the multimedia content that is being streamed at the client device and the given dialog content that was rendered at the client device (and any other multimedia content that was previously streamed and/or dialog content that was previously rendered). Accordingly, the system can continue the streaming of the multimedia content and the rendering of the dialog content by selectively determining when to generate the additional structured LLM query. Put another way, the system can proactively generate the additional structured LLM query while causing the client device to continue the streaming of the multimedia content and/or the rendering of the dialog content. This enables the system to reduce latency in causing this content to be provided for presentation to the user.

Although the method 300 is depicted as including particular operations in a particular order, it should be understood that is for the sake of example and is not meant to be limiting. For example, the system may always perform iterations of block 362 and/or block 364 as a background process while the system is streaming the multimedia content and/or rendering the dialog content. Further, additional operations not depicted in the method 300 may additionally or alternatively be included, such as operations associated with respect to determining when to cause the client device to render the given dialog content (e.g., as described with respect to FIGS. 4, 6A, and 6B).

Turning now to FIG. 4, a flowchart illustrating an example method 400 of determining when to cause a client device to render dialog content with respect to a stream of multimedia content being streamed at the client device is depicted. For convenience, the operations of the method 400 are described with reference to a system that performs the operations. This system of the method 400 includes one or more processors, memory, and/or other component(s) of computing device(s) (e.g., client device 110 of FIG. 1, LLM output system 120 of FIG. 1, client device 510 of FIGS. 5A and 5B, client device 610 of FIGS. 6A and 6B, computing device 710 of FIG. 7, one or more servers, and/or other computing devices). Moreover, while operations of the method 400 are shown in a particular order, this is not meant to be limiting. One or more operations may be reordered, omitted, and/or added.

At block 452, the system determines whether to initiate streaming of multimedia content at a client device. If, at an iteration of block 452, the system determines not to initiate the streaming of the multimedia content at the client device, then the system can continue monitoring for whether to initiate the streaming of the multimedia content at the client device at block 452. If, at an iteration of block 452, the system determines to initiate the streaming of the multimedia content at the client device, then the system can proceed to block 454. At block 454, the system generates, based on at least contextual data associated with a user of a client device, a structured LLM query. At block 456, the system generates, based on processing the structured LLM query, LLM output that includes an indication of given multimedia content and given dialog content. At block 458, the system causes the client device to initiate streaming of the given multimedia content. The operations of blocks 452-458 of the method 400 of FIG. 4 can be performed in the same or similar manner described above with respect to block 352-358 of the method 300 of FIG. 3, respectively.

At block 460, the system determines when to render the given dialog content at the client device and with respect to the streaming of the given multimedia content. In some implementations, the system can identify multimedia content metadata that is associated with the given multimedia content (e.g., via the multimedia content engine 182 described with respect to FIGS. 1 and 2 or via the LLM output itself). The multimedia content metadata can include, for instance, information associated with the given multimedia content, such as a duration of the given multimedia content, timestamps for the given multimedia content that identify various portions of the given multimedia content (e.g., an intro, a bridge, an outro, and/or other portions of the given multimedia content), listening and/or viewing metrics associated with the given multimedia content (e.g., whether a particular portion of the given multimedia content is popular and/or typically listened to or viewed by a threshold quantity of users), and/or any other data associated with the given multimedia content. In these implementations, the system can determine, based on the multimedia content metadata that is associated with the given multimedia content and based on the given dialog content, when to render the given dialog content at the client device and with respect to the streaming of the given multimedia content.

For example, the system may typically determine to render the given dialog content during an intro portion of the given multimedia content in an attempt to utilize the given dialog content to introduce the given multimedia content. In some of these examples, listening and/or viewing metrics associated with the given multimedia content may indicate that the intro portion of the given multimedia content is the most popular portion of the given multimedia content. Accordingly, in these examples, the system may determine to render the dialog content during a bridge portion of the given multimedia content or an outro portion of the given multimedia content, and instead of the intro portion of the given multimedia content. In other of these examples, a duration needed to audibly render the given dialog content may exceed a duration of the intro portion of the given multimedia content such that the audibly rendering of the given dialog content would overlap with spoken words included in the given multimedia content. Accordingly, in these examples, the system may also determine to render the given dialog content during the bridge portion of the given multimedia content or the outro portion of the given multimedia content, and instead of the intro portion of the given multimedia content.

In additional or alternative implementations, the system can determine, based on content included in the given dialog content, when to render the given dialog content at the client device and with respect to the streaming of the given multimedia content. As noted above (e.g., with respect to FIG. 2), the given dialog content may not only include information related to the given multimedia content, but may also include other information, such as information from various news sources or related to various sports teams. In these instances, the content may include noteworthy information, such as breaking news stories or sports stories. Accordingly, in these instances, the system can determine to render the given dialog content immediately to convey the breaking news stories or sports stories regardless of the multimedia content metadata. In this manner, the system can proactively provide information for presentation to the user in a timely manner when appropriated.

If, at an iteration of block 460, the system determines not to refrain from rendering the given dialog content, then the system can continue monitoring for when to render the given dialog content at the client device and with respect to the streaming of the given multimedia content at block 460. For example, the system (e.g., via the temporal engine 185) can transmit instructions to the client device for when to render the given dialog content at the client device and with respect to the streaming of the given multimedia content, and the system can cause the client device refrain from rendering the given dialog content until a time during the streaming of the given multimedia content when the instructions indicate that the given dialog content should be rendered. If, at an iteration of block 460, the system determines to render the given dialog content at the client device and with respect to the streaming of the given multimedia content, then the system can proceed to block 462.

At block 462, the system causes the client device to duck a volume of the given multimedia content. At block 464, the system causes the client device to audibly render the given dialog content. For example, assume that the given multimedia content is being audibly rendered at the volume at the client device. In this example, the volume at which the given multimedia content is being audibly rendered can be lowered to enable the client device to clearly convey the information included in the given dialog content such that it is audibly perceptible to a user of the client device and without ceasing the streaming of the given multimedia content. In implementations where the given multimedia content also includes visual multimedia content (e.g., video, images, animations, etc.), the system can cause the visual multimedia content to still be rendered at the given client device while the volume of the given multimedia content is ducked to audibly rendered the given dialog content. Subsequent to the given dialog content being audibly rendered at the client device, the system can cause the client device to un-duck the volume of the given multimedia content.

At block 466, the system determines whether to continue the streaming of the multimedia content. The system can determine to continue the streaming of the multimedia content until an indication of additional user input is received to halt the streaming of the multimedia content and/or the rendering of the dialog content. The indication of the additional user input to halt the streaming of the multimedia content and/or the rendering of the dialog content can include, for example, the user closing the software application, the user providing a voice command to halt the streaming of the multimedia content and/or the rendering of the dialog content, and/or in other manners. If, at an iteration of block 466, the system determines to continue the streaming of the multimedia content, then the system can return to block 454 to generate an additional structured LLM query. If, at an iteration of block 466, the system determines not to continue the streaming of the multimedia content, then the system can return to block 452 to again determine whether to streaming of multimedia content at a client device. Notably, in continuing with the method 400 at block 454 and from block 466, the system can generate the additional structured LLM query based on additional contextual data. The additional contextual data can include the indication of the multimedia content that is being streamed at the client device and the given dialog content that was rendered at the client device (and any other multimedia content that was previously streamed and/or dialog content that was previously rendered).

Although the method 400 is depicted as including particular operations in a particular order, it should be understood that is for the sake of example and is not meant to be limiting. For example, the system may always perform iterations of block 460 and/or block 466 as a background process while the system is streaming the multimedia content and/or rendering the dialog content. Further, additional operations not depicted in the method 400 may additionally or alternatively be included, such as operations associated with respect to determining when to generate the additional structured LLM query (e.g., as described with respect to FIGS. 3, 5A, and 5B).

Figure 5A:
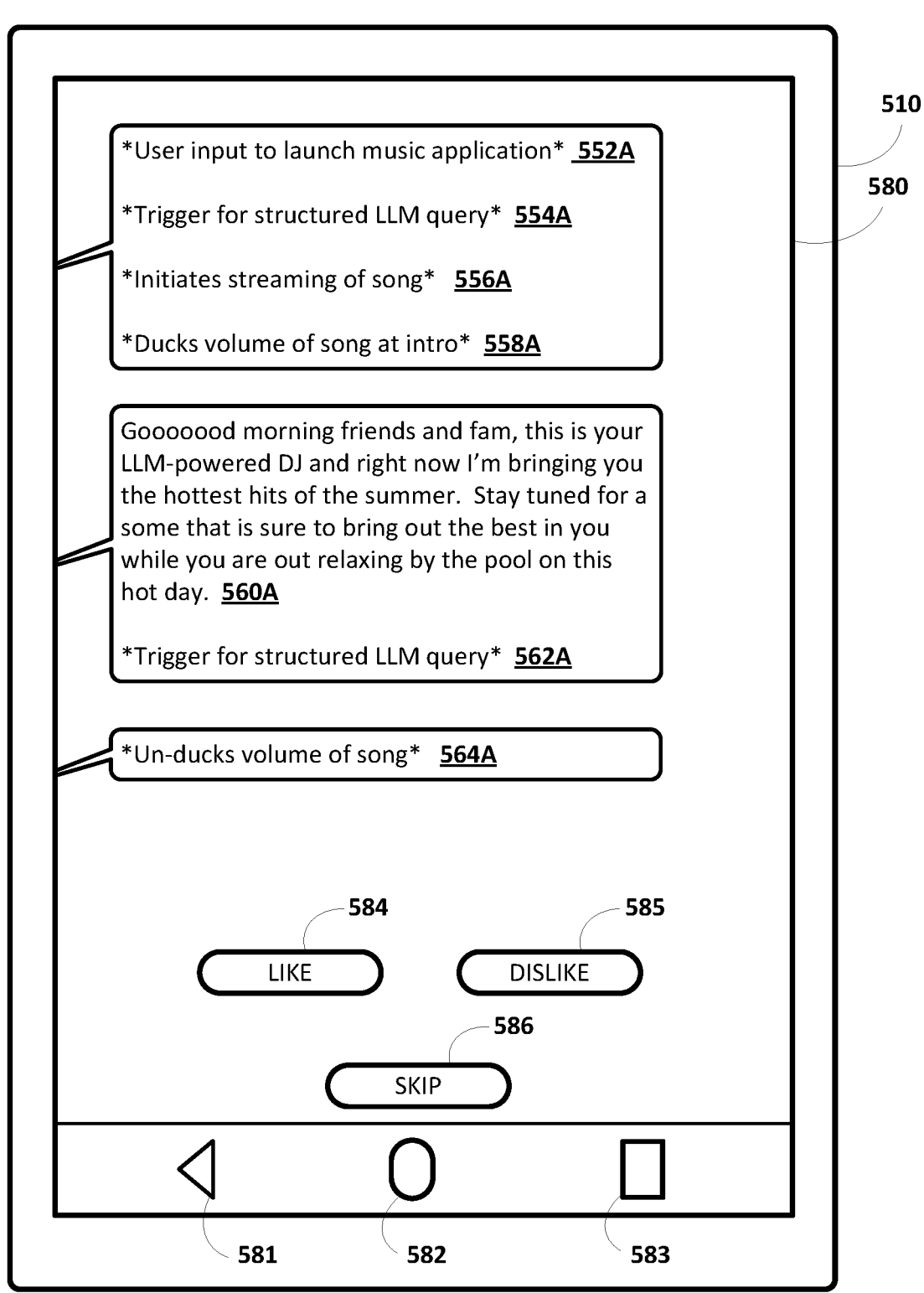
FIG. 5A and FIG. 5B depict various non-limiting examples of determining when to generate structured large language model (LLM) queries, in accordance with various implementations.
Figure 5B:
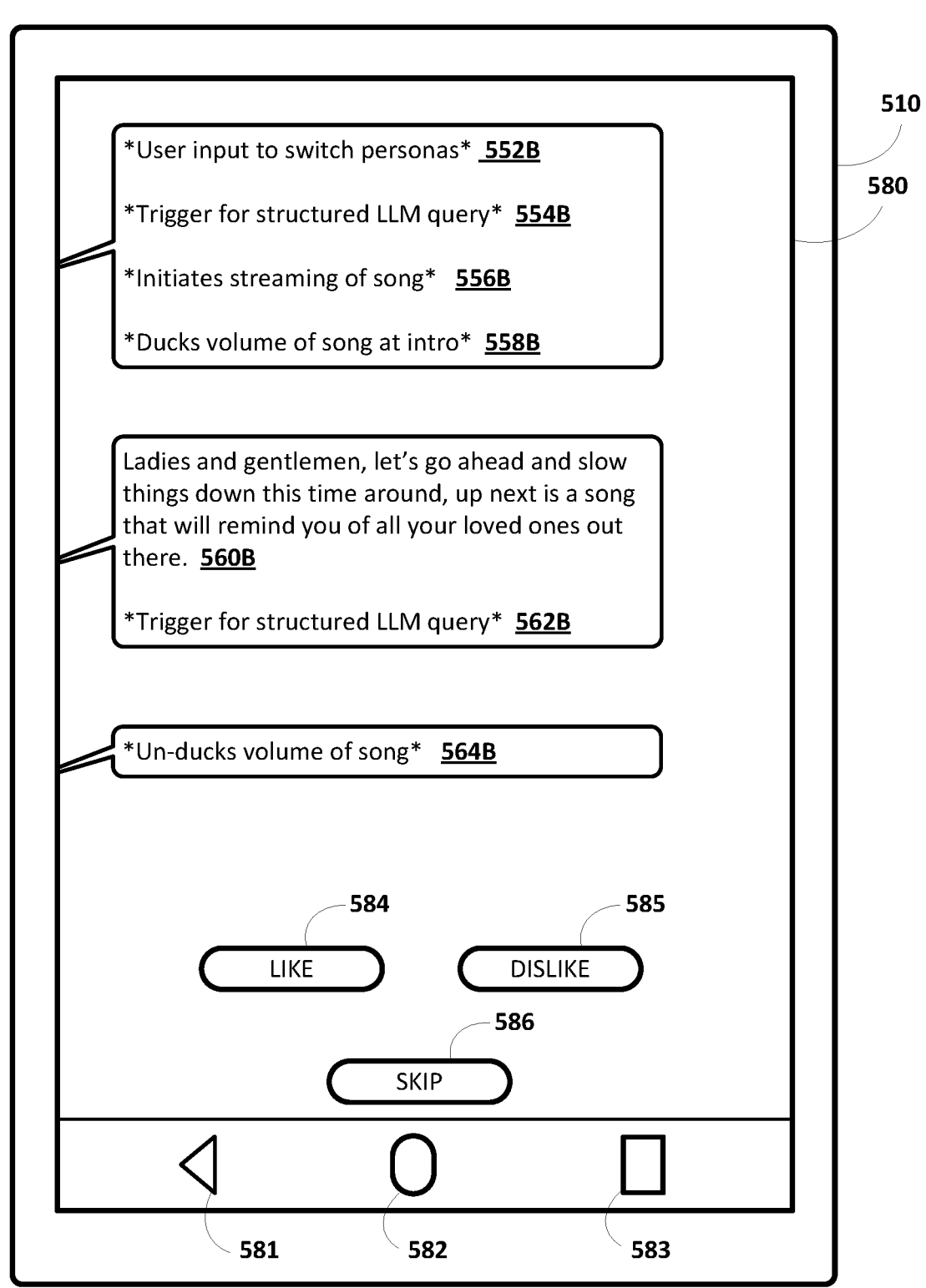

Turning now to FIGS. 5A and 5B, various non-limiting examples of determining when to generate structured large language model (LLM) queries are depicted. A client device 510 (e.g., an instance of the client device 110 of FIG. 1) may include various user interface components including, for example, microphone(s) to generate audio data based on spoken utterances and/or other audible input, speaker(s) to audibly render synthesized speech and/or other audible output, and/or a display 580 to visually render visual output. Further, the display 580 of the client device 510 can include various system interface elements 581, 582, and 583 (e.g., hardware and/or software interface elements) that may be interacted with by a user of the client device 510 to cause the client device 510 to perform one or more actions. The display 580 of the client device 710 enables the user to interact with content rendered on the display 580 by touch input (e.g., by directing user input to the display 580 or portions thereof (e.g., to a text entry box, to a keyboard, or to other portions of the display 580) and/or by spoken input (e.g., by selecting microphone interface element—or just by speaking without necessarily selecting the microphone interface element (i.e., a chatbot may monitor for one or more terms or phrases, gesture(s) gaze(s), mouth movement(s), lip movement(s), and/or other conditions to activate spoken input) at the client device 510). Although the client device 510 depicted in FIGS. 5A and 5B is a mobile phone, it should be understood that is for the sake of example and is not meant to be limiting.

Referring specifically to FIG. 5A, assume that user input is received at the client device 510 to launch a music application as indicated by 552A. The user input can be utilized as an initial trigger for a structured LLM query as indicated by 554A, and the client device can initiate streaming of a song as given multimedia content as indicated by 556A and based on LLM output that is generated in response to the structured LLM query. Further assume that the client device 510 ducks a volume of the song at an intro of the song as indicated by 558A. This enables the client device 510 to audibly render given dialog content 560A without interrupting the streaming of the song. In this example, completing rendering of the given dialog content 560A can be utilized as a subsequent trigger for an additional structured LLM query as indicated by 562A. Further, the client device 510 can un-duck the volume of the song as indicated by 564A and continue with the streaming of the song.

Notably, in this example, the completing of the rendering of the given dialog content 560A is utilized as the subsequent trigger for the additional structured LLM query. This enables the client device 510 to receive an indication of additional given multimedia content that is utilized to continue the streaming of the multimedia content and additional given dialog content that is to be rendered in connection with the additional given multimedia content while the song is still being streamed at the client device 510. The additional given multimedia content and the additional given dialog content can be provided to the client device (e.g., by the LLM output system 120 of FIG. 1) to enable the system to seamlessly continue the streaming of the multimedia content. As a result, latency in causing the streaming of the multimedia content to be continued can be reduced since the additional given multimedia content and the additional given dialog are already available at the client device 510 prior to the song being completed during the streaming.

Although the example of FIG. 5A is described with respect to the completing of the rendering of the given dialog content 560A being utilized as the subsequent trigger for the additional structured LLM query, it should be understood that is for the sake of example and is not meant to be limiting. For example, the user of the client device 510 can provide additional user input that includes feedback for the streaming of the given multimedia content. Some non-limiting examples of how the user can provide the additional user input that includes the feedback are depicted in FIG. 5A. For instance, the user can "like" the song that is being streamed at the client device 510 via directing the additional user input (e.g., touch input, spoken input, etc.) to a "like" selectable graphical element 584, "dislike" the song that is being streamed at the client device 510 via directing the additional user input to a "dislike" selectable graphical element 585, and "skip" the song that is being streamed at the client device 510 via directing the additional user input to a "skip" selectable graphical element 586. In some of these instances, the selection of the "like" selectable graphical element 584 or the "dislike" selectable graphical element 585 can be utilized as part of additional contextual data or further additional contextual data in generating the additional structured LLM query or a further additional structured LLM query to influence the additional given multimedia content or further additional given multimedia content that is to be streamed at the client device, but the streaming of the given multimedia content is continued. In other of these instances, the selection of the "like" selectable graphical element 584 or the "dislike" selectable graphical element 585 can be utilized as the subsequent trigger for the additional structured LLM query, but the streaming of the given multimedia content is continued. Moreover, the selection of the "skip" selectable graphical element 586 can be utilized as the subsequent trigger for the additional structured LLM query, but the streaming of the given multimedia content is halted until the additional given multimedia content is provided to the client device.

As another example, and referring specifically to FIG. 5B, assume that the given dialog content is rendered via chatbot and that the chatbot is assigned a given persona from among a plurality of disparate personas. The given persona can be embodied by, for example, a given vocabulary that is utilized in generating the given dialog content and that is specific to the given persona, a given set of prosodic properties that is utilized in rendering the given dialog content and that is specific to the given persona and that is utilized in synthesizing the given dialog content for audible presentation to the user, and/or a given set of visual cues for a visualized representation of the given persona (e.g., an animated avatar or entity) that is utilized in rendering the given dialog content and that includes at least some visual cues that are specific to the given persona and some visual cues that are common amongst multiple personas of the plurality of disparate personas (e.g., waving, certain facial expressions, etc.).

Further assume that the user changes the given persona that is assigned to the chatbot as indicated by 552B. In this example, the user changing the given persona utilized as the subsequent trigger for the additional structured LLM query as indicated by 554B. Accordingly, and in response to obtaining an indication of given multimedia content and given dialog content, the client device can initiate streaming of a song as the given multimedia content as indicated by 556B and based on LLM output that is generated in response to the structured LLM query. Further assume that the client device ducks a volume of the song at an intro of the song as indicated by 558B. This enables the client device 510 to audibly render given dialog content 560B without interrupting the streaming of the song. In this example, completing rendering of the given dialog content 560B can be utilized as another subsequent trigger for an additional structured LLM query as indicated by 562B. Further, the client device

510 can un-duck the volume of the song as indicated by 564B and continue with the streaming of the song.

By changing the given persona, the user can effectively change the given dialog content and/or how the chatbot provides the given dialog content. Further assume that the given persona utilized in generating and/or rendering the given dialog content in the example of FIG. 5A is a "hip hop" persona, whereas the given persona utilized in generating and/or rendering the given dialog content in the example of FIG. 5B is a "jazz" persona. For instance, the "hip hop" persona in the example is FIG. 5A can be reflected by the upbeat nature of the given dialog content 560A (and optionally a high tempo and/or high volume of in audibly rendering the given dialog content 560A), whereas the "jazz" persona in the example of FIG. 5B can be reflected by the more formal nature of the given dialog content 560B (and optionally a slower tempo and/or lower volume of in audibly rendering the given dialog content 560B).

Notably, in implementations where an indication of given multimedia content and given dialog content has been provided to the client device 510 based on a previous structured LLM query but has yet to be streamed and/or rendered, and an additional structured LLM query is triggered (e.g., based on a change in the given persona assigned to the chatbot, based on additional user input, etc.), the given multimedia content and the given dialog content can be discarded. Put another way, the given multimedia content and the given dialog content that is most recently received can be utilized instead of previously received multimedia content and previously received dialog content.

Figure 6B:
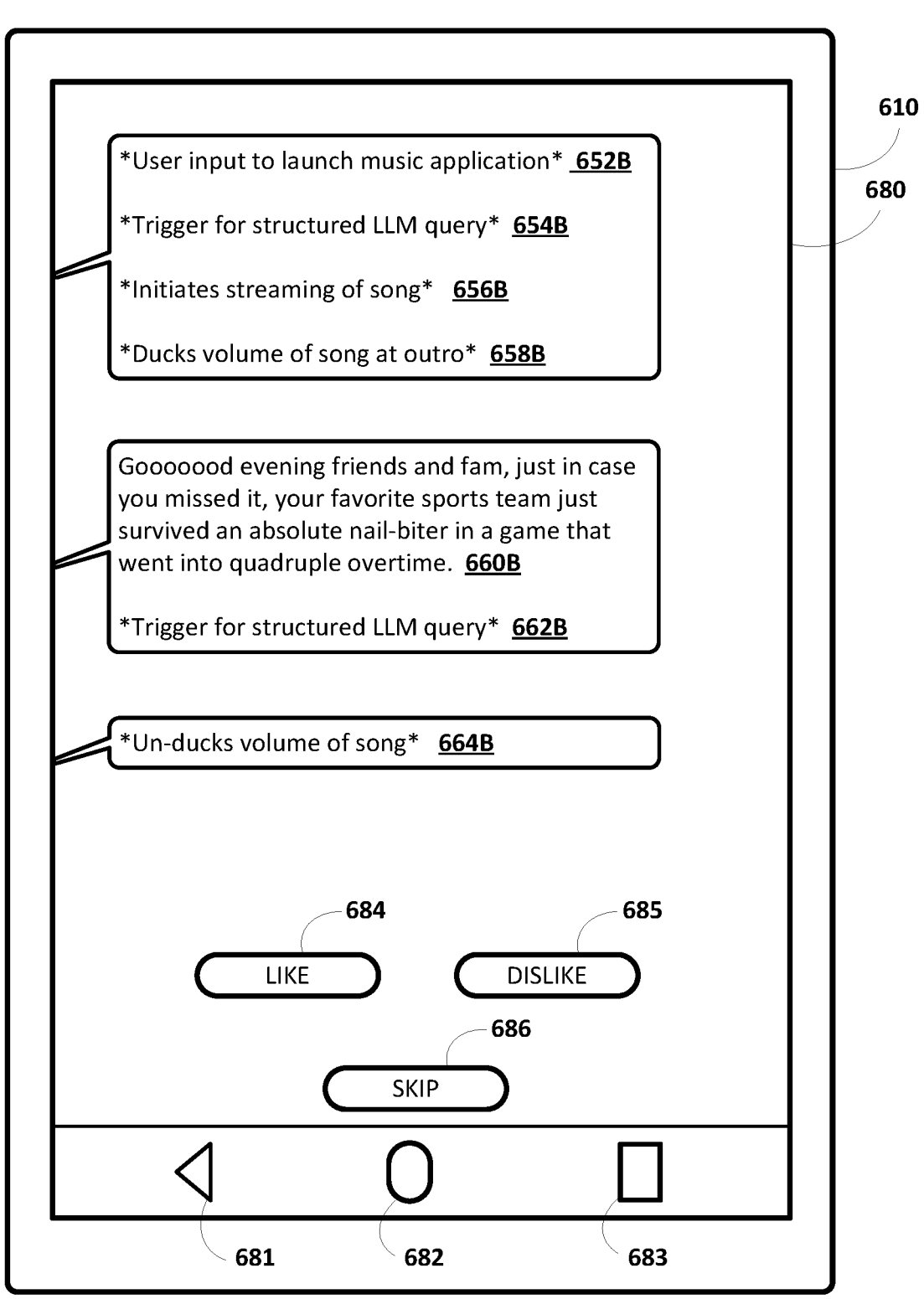

Turning now to FIGS. 6A and 6B, various non-limiting examples of determining when to cause a client device to render dialog content with respect to a stream of multimedia content being streamed at the client device are depicted. A client device 610 (e.g., an instance of the client device 110 of FIG. 1) may include various user interface components including, for example, microphone(s) to generate audio data based on spoken utterances and/or other audible input, speaker(s) to audibly render synthesized speech and/or other audible output, and/or a display 680 to visually render visual output. Further, the display 680 of the client device 610 can include various system interface elements 681, 682, and 683 (e.g., hardware and/or software interface elements) that may be interacted with by a user of the client device 610 to cause the client device 610 to perform one or more actions. The display 680 of the client device 710 enables the user to interact with content rendered on the display 680 by touch input (e.g., by directing user input to the display 680 or portions thereof (e.g., to a text entry box, to a keyboard, or to other portions of the display 680) and/or by spoken input (e.g., by selecting microphone interface element—or just by speaking without necessarily selecting the microphone interface element (i.e., a chatbot may monitor for one or more terms or phrases, gesture(s) gaze(s), mouth movement(s), lip movement(s), and/or other conditions to activate spoken input) at the client device 610). Although the client device 610 depicted in FIGS. 6A and 6B is a mobile phone, it should be understood that is for the sake of example and is not meant to be limiting.

Referring specifically to FIG. 6A, assume that user input is received at the client device 610 to launch a music application as indicated by 652A. The user input can be utilized as an initial trigger for a structured LLM query as indicated by 654A, and the client device can initiate streaming of a song as given multimedia content as indicated by 656A and based on LLM output that is generated in response to the structured LLM query in the same or similar manner described with respect to FIG. 5A. Further assume that the client device 610 ducks a volume of the song at a bridge of the song as indicated by 658A. This enables the client device 610 to audibly render given dialog content 660A without interrupting the streaming of the song. In this example, completing rendering of the given dialog content 660A can be utilized as a subsequent trigger for an additional structured LLM query as indicated by 662A. Further, the client device 610 can un-duck the volume of the song as indicated by 664A and continue with the streaming of the song.

Notably, in the example of FIG. 6A and in contrast with the examples of FIGS. 5A and 5B, the client device 610 ducks the volume of the song at the bridge of the song as indicated by 658A. The client device 610 may duck the volume of the song at the bridge of the song rather than the intro of the song for various reasons. As described above (e.g., with respect to FIG. 4), multimedia content metadata may be utilized to determine when to render the given dialog content. Accordingly, in this example, assume that the multimedia content metadata indicates the intro of the song is the most popular part of the song. As a result, ducking the volume of the song during the intro of the song may detract from the user experience and/or be undesirable, so the client device 610 renders the given dialog content 660A during the bridge of the song instead.

Referring specifically to FIG. 6B, assume that user input is received at the client device 610 to launch a music application as indicated by 652B. The user input can be utilized as an initial trigger for a structured LLM query as indicated by 654B, and the client device can initiate streaming of a song as given multimedia content as indicated by 656B and based on LLM output that is generated in response to the structured LLM query in the same or similar manner described with respect to FIG. 5A. Further assume that the client device 610 ducks a volume of the song at an outro of the song as indicated by 658B. This enables the client device 610 to audibly render given dialog content 660B without interrupting the streaming of the song. In this example, completing rendering of the given dialog content 660A can be utilized as a subsequent trigger for an additional structured LLM query as indicated by 662B. Further, the client device 610 can un-duck the volume of the song as indicated by 664B and continue with the streaming of the song.

Notably, in the example of FIG. 6B and in contrast with the examples of FIGS. 5A, 5B, and 6A, the client device 610 ducks the volume of the song at the outro of the song as indicated by 658B. The client device 610 may duck the volume of the song at the outro of the song rather than the intro of the song or the bridge of the song for various reasons. As described above (e.g., with respect to FIG. 4), information included in the given dialog content may additionally, or alternatively, or utilized to determine when to render the given dialog content. Accordingly, in this example, assume that the given dialog content 660B includes newsworthy content to be provided for presentation to the user. As a result, ducking the volume of the song enables the client device 610 to quickly and efficiently provide desirable information to the user.

Although the examples of FIGS. 5A, 5B, 6A, and 6B depict a transcript of the given dialog content, it should be understood that is for the sake of example and is not meant to be limiting. Further, although the examples of FIGS. 5A, 5B, 6A, and 6B are described with respect to the multimedia content being a song that is streamed via a music software application, it should be understood that is also or the sake of example and is not meant to be limiting. Rather, it should be understood that other forms of multimedia content are contemplated herein that can be rendered via other software applications or a chatbot or automated assistant software application. Moreover, although the examples of FIGS. 5A, 5B, 6A, and 6B are described with respect to the multimedia content being streamed at a single client device, it should be understood that is for the sake of example and is not meant to be limiting. For example, multiple users can listen to the multimedia content and/or the dialog content. In this example, a primary user (e.g., a user of the client device 510, 610) can share the streaming with other users (e.g., via a shareable hyperlink), but the contextual data utilized in generating the structured LLM queries may be limited to that of the primary user.

Figure 7:
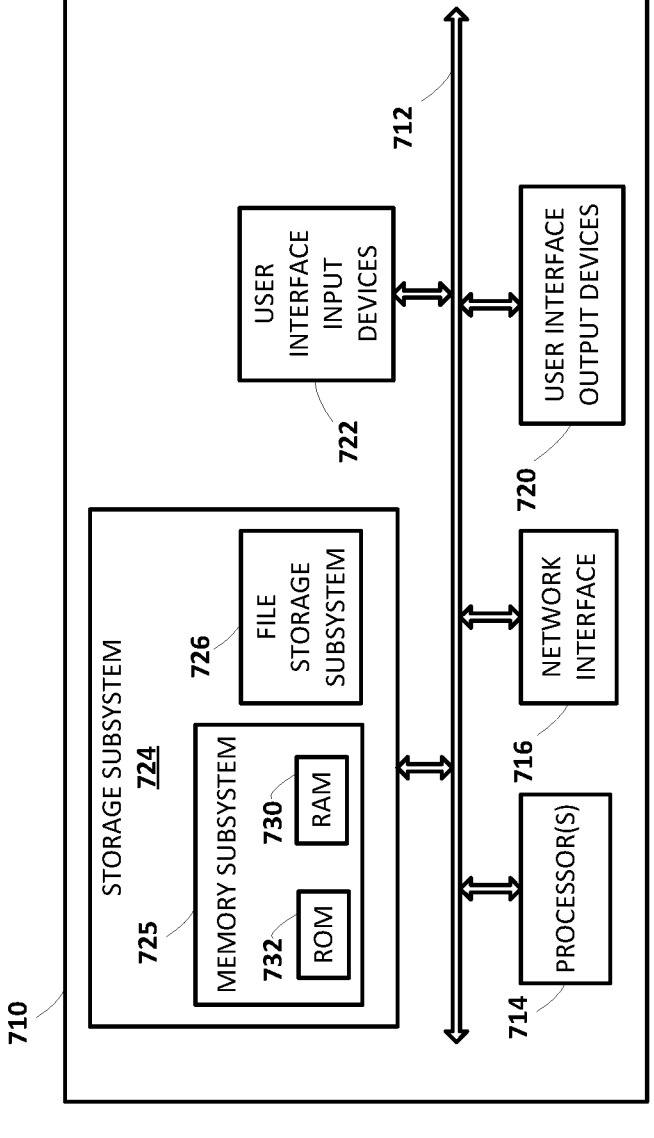
FIG. 7 depicts an example architecture of a computing device, in accordance with various implementations.

Turning now to FIG. 7, a block diagram of an example computing device 710 that may optionally be utilized to perform one or more aspects of techniques described herein is depicted. In some implementations, one or more of a client device, cloud-based automated assistant component(s), and/or other component(s) may comprise one or more components of the example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the methods disclosed herein, as well as to implement various components depicted in FIGS. 1 and 2.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD- ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem 712 may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes receiving an indication of user input to initiate streaming of multimedia content at a client device of a user; and in response to receiving the indication of the user input to initiate the streaming of the multimedia content: generating, based on at least contextual data associated with the user of the client device, a structured large language model (LLM) query; and generating, based on processing the structured LLM query, LLM output, wherein the LLM output includes at least an indication of given multimedia content and given dialog content. The method further includes causing the client device to initiate the streaming of the given multimedia content; causing the client device to render the given dialog content before the client device initiates the streaming of the given multimedia content or while the given multimedia content is being streamed at the client device; determining when to generate an additional structured LLM query to continue the streaming of the multimedia content; and in response to determining to generate the additional structured LLM query to continue the streaming of the multimedia content: generating, based on at least additional contextual data associated with the user of the client device, the additional structured LLM query; and generating, based on the additional structured LLM query, additional LLM output, wherein the additional LLM output includes at least an indication of given additional multimedia content and given additional dialog content. The method further includes causing the client device to initiate the streaming of the given additional multimedia content; and causing the client device to render the given additional dialog content before the client device initiates streaming of the given additional multimedia content or while the given additional multimedia content is being streamed at the client device.

These and other implementations of technology disclosed herein can optionally include one or more of the following features.

In some implementations, determining to generate the additional structured LLM query to continue the streaming of the multimedia content can be in response to completing rendering of the given dialog content.

In some implementations, determining to generate the additional structured LLM query to continue the streaming of the multimedia content can be in response to receiving an additional indication of additional user input to skip streaming of the given multimedia content at the client device.

In some implementations, the method can further include utilizing a given persona, from among a plurality of disparate personas, in generating and/or rendering of the given dialog content.

In some versions of those implementations, determining to generate the additional structured LLM query to continue the streaming of the multimedia content can be in response to receiving an additional indication of additional user input to change the given persona utilized in generating and/or rendering of the dialog content.

In additional or alternative versions of those implementations, the user input to initiate the streaming of the multimedia content can be received via a software application that is accessible by the client device, and settings for the software application enable the user to modify the given persona utilized in generating and/or rendering of the dialog content.

In some further versions of those implementations, the settings for the software application can further enable the user to modify one or more of: music preferences, video preferences, new source preferences, or sports team preferences.

In additional or alternative versions of those implementations, the LLM output can be generated using an LLM that is a first-party LLM and that is associated with a first-party entity, the software application can be a third-party software application that is associated with a third-party entity, and the third-party entity can differ from the first-party entity.

In some implementations, the indication of the given multimedia content can include an indication of audible multimedia content, and causing the client device to initiate the streaming of the given additional multimedia content can include causing the audible multimedia content to be audibly rendered via one or more speakers of the client device. Further, causing the client device to render the given dialog content can be while the given multimedia content, and can include: causing the client device to duck a volume of the audible multimedia content that is being audibly rendered via the one or more speakers of the client device; and causing, while the volume of the audible multimedia content is being ducked, the client device to audibly render the given dialog content via the one or more speakers of the client device.

In some versions of those implementations, the method can further include identifying a given persona, from among a plurality of disparate personas, to be utilized in generating and/or rendering of the given dialog content; selecting, based on the given person to be utilized generating and/or rendering of the given dialog content, a given text-to-speech (TTS) machine learning (ML) model, from among a plurality of disparate TTS ML models; processing, using the given TTS ML model, the given dialog content to generate audible dialog content; and causing the client device to audibly render the audible dialog content as the given dialog content via the one or more speakers of the client device.

In some versions of those implementations, the indication of the given multimedia content can further include an indication of visual multimedia content, and causing the client device to render the given dialog content while the given multimedia content is being streamed at the client device can include continuing causing, while the volume of the audible multimedia content is being ducked and while the audible dialog content is being audibly rendered via the one or more speakers of the client device, the client device to visually render the visual multimedia content via a display of the client device.

In some implementations, the given dialog content can include multimedia content information associated with the given multimedia content.

In some implementations, the given dialog content can include news information or sports information that is not associated with the given multimedia content.

In some implementations, the contextual data associated with the user of the client device can include one or more of: music preferences, video preferences, new source preferences, sports team preferences, or search results.

In some versions of those implementations, the contextual data associated with the user of the client device may not include any explicit user input provided by the user of the client device.

In some implementations, the method further includes, prior to receiving the indication of the user input to initiate the streaming of the multimedia content at the client device of the user: fine-tuning a LLM based on a plurality of training instances to generate a fine-tuned LLM, each of the training instances including a (i) corresponding structured query, and (ii) corresponding multimedia content and corresponding dialog content associated with the corresponding structured query.

In some versions of those implementations, generating the LLM output based on processing the structured LLM query can include processing, using the fine-tuned LLM, the structured LLM query to generate the LLM output.

In some implementations, a method implemented by one or more processors is provided, and includes receiving an indication of user input to initiate streaming of multimedia content at a client device of a user; and in response to receiving the indication of the user input to initiate the streaming of the multimedia content: generating, based on at least contextual data associated with the user of the client device, a structured large language model (LLM) query; and generating, based on the structured LLM query, LLM output, wherein the LLM output includes at least given multimedia content and given dialog content. The method further includes causing the client device to initiate the streaming of the given multimedia content via one or more speakers of the client device; determining when to audibly render the given dialog content with respect to the streaming of the given multimedia content; and in response to determining to audibly render the given dialog content: causing the client device to duck a volume of the given multimedia content via one or more speakers of the client device; and causing, while the client device is ducking the volume of the given multimedia content, the client device to audibly render the given dialog content via the one or more speakers of the client device. The method further includes, in response to completing audible rendering of the given dialog content: generating, based on at least additional contextual data associated with the user of the client device, an additional structured LLM query; and generating, based on the additional structured LLM query, additional LLM output, wherein the LLM output includes at least given additional multimedia content and given additional dialog content.

These and other implementations of technology disclosed herein can optionally include one or more of the following features.

In some implementations, determining when to audibly render the given dialog content with respect to the streaming of the given multimedia content can include determining a target portion of the given multimedia content during which the given dialog content is to be audibly rendered via the one or more speakers of the client device; and determining to audibly render the given dialog content during the target portion of the given multimedia content.

In some versions of those implementations, determining the target portion of the given multimedia content during which the given dialog content is to be audibly rendered via the one or more speakers of the client device can include determining a duration of time needed to audibly render the given dialog content; identifying a plurality of target portions of the given multimedia content during that do not include spoken content for the duration of time needed to audibly render the given dialog content; and selecting, based on one or more properties associated with the given multimedia content, a given target portion of the given multimedia, from among the plurality of target portions of the multimedia content, as the target portion of the given multimedia content.

In some further versions of those implementations, the one or more properties can be associated with the given multimedia content, and the one or more properties associated with the given multimedia content can include one or more of: popularity information associated with each of the plurality of target portions, or user listening history information associated with each of the plurality of target portions.

In additional or alternative versions of those implementations, the given multimedia content can include a song, and the target portion of the given multimedia content can include an intro to the song.

In additional or alternative versions of those implementations, the given multimedia content can include a song, and the target portion of the given multimedia content can include an outro of the song.

In additional or alternative versions of those implementations, the given multimedia content can include a song, and the target portion of the given multimedia content can include a bridge of the song.

In some implementations, a method implemented by one or more processors is provided, and includes generating, based on at least contextual data associated with a user of a client device, a structured large language model (LLM) query to initiate streaming of multimedia content at the client device of the user via a software application that is accessible at the client device; generating, based on processing the structured LLM query, LLM output, wherein the LLM output includes at least given multimedia content and given dialog content; causing the client device to initiate the streaming of the given multimedia content via one or more speakers of the client device; and causing the client device to render the given dialog content before the client device initiates the streaming of the given multimedia content or while the given multimedia content is being streamed at the client device.

These and other implementations of technology disclosed herein can optionally include one or more of the following features.

In some implementations, the LLM output can be generated using an LLM that is a first-party LLM and that is associated with a first-party entity, the software application can be a third-party software application that is associated with a third-party entity, and the third-party entity can differ from the first-party entity.

In some implementations, the contextual data associated with the user of the client device can include one or more search results.

In some versions of those implementations, the one or more search results can include search results for news stories that are obtained during a same day that the structured LLM query is generated.

In some further versions of those implementations, the given dialog content can include a summary of the new stories.

In additional or alternative versions of those implementations, the one or more search results can include search results for sports stories that are obtained immediately prior to the structured LLM query being generated.

In some further versions of those implementations, the given dialog content can include a summary of the sports stories.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

What is claimed is:

1. A method implemented by one or more processors, the method comprising:

receiving an indication of user input to initiate streaming of multimedia content at a client device of a user;

in response to receiving the indication of the user input to initiate the streaming of the multimedia content:

generating, based on at least contextual data associated with the user of the client device, a structured large language model (LLM) query;

generating, based on processing the structured LLM query, LLM output;

determining, based on the LLM output, given multimedia content and given dialog content, wherein determining the given multimedia content based on the LLM output comprises:

establishing, based on the LLM output, a communication session with a multimedia content service provider; and obtaining, from the multimedia content service provider and during the communication session, the given multimedia content; and in response to determining the given multimedia content and the given dialog content:

causing the client device to initiate the streaming of the given multimedia content that was obtained from the multimedia content service provider and during the communication session established based on the LLM output; and causing the client device to render the given dialog content before the client device initiates the streaming of the given multimedia content or while the given multimedia content is being streamed at the client device;

determining when to generate an additional structured LLM query to continue the streaming of the multimedia content;

in response to determining to generate the additional structured LLM query to continue the streaming of the multimedia content:

generating, based on at least additional contextual data associated with the user of the client device, the additional structured LLM query;

generating, based on the additional structured LLM query, additional LLM output; and determining, based on the additional LLM output, given additional multimedia content and given additional dialog content, wherein determining the given additional multimedia content based on the additional LLM output comprises:

continuing, based on the additional LLM output, the communication session with the multimedia content service provider; and obtaining, from the multimedia content service provider and during the communication session, the given additional multimedia content; and subsequent to determining the given additional multimedia content and the given additional dialog content:

causing the client device to initiate the streaming of the given additional multimedia content that was obtained from the multimedia content service provider and during the communication session continued based on the additional LLM output; and causing the client device to render the given additional dialog content before the client device initiates streaming of the given additional multimedia content or while the given additional multimedia content is being streamed at the client device.

2. The method of claim 1, wherein determining to generate the additional structured LLM query to continue the streaming of the multimedia content is in response to completing rendering of the given dialog content.

3. The method of claim 1, wherein determining to generate the additional structured LLM query to continue the streaming of the multimedia content is in response to receiving an additional indication of additional user input to skip streaming of the given multimedia content at the client device.

4. The method of claim 1, further comprising:

utilizing a given persona, from among a plurality of disparate personas, in generating and/or rendering of the given dialog content.

5. The method of claim 4, wherein determining to generate the additional structured LLM query to continue the streaming of the multimedia content is in response to receiving an additional indication of additional user input to change the given persona utilized in generating and/or rendering of the given dialog content.

6. The method of claim 4, wherein the user input to initiate the streaming of the multimedia content is received via a software application that is accessible by the client device, and wherein settings for the software application enable the user to modify the given persona utilized in generating and/or rendering of the given dialog content.

7. The method of claim 6, wherein the settings for the software application further enable the user to modify one or more of: music preferences, video preferences, news source preferences, or sports team preferences.

8. The method of claim 6, wherein the LLM output is generated using an LLM that is a first-party LLM and that is associated with a first-party entity, wherein the software application is a third-party software application that is associated with a third-party entity, and wherein the third-party entity differs from the first-party entity.

9. The method of claim 1, wherein the indication of the given multimedia content includes an indication of audible multimedia content, wherein causing the client device to initiate the streaming of the given additional multimedia content comprises causing the audible multimedia content to be audibly rendered via one or more speakers of the client device, wherein causing the client device to render the given dialog content is while the given multimedia content is being streamed, and wherein causing the client device to render the given dialog content while the given multimedia content is being streamed at the client device comprises:

causing the client device to duck a volume of the audible multimedia content that is being audibly rendered via the one or more speakers of the client device; and causing, while the volume of the audible multimedia content is being ducked, the client device to audibly render the given dialog content via the one or more speakers of the client device.

10. The method of claim 9, further comprising:

identifying a given persona, from among a plurality of disparate personas, to be utilized in generating and/or rendering of the given dialog content;

selecting, based on the given persona to be utilized in generating and/or rendering of the given dialog content, a given text-to-speech (TTS) machine learning (ML) model, from among a plurality of disparate TTS ML models;

processing, using the given TTS ML model, the given dialog content to generate audible dialog content; and causing the client device to audibly render the audible dialog content as the given dialog content via the one or more speakers of the client device.

11. The method of claim 10, wherein the indication of the given multimedia content further includes an indication of visual multimedia content, and wherein causing the client device to render the given dialog content while the given multimedia content is being streamed at the client device comprises:

continuing causing, while the volume of the audible multimedia content is being ducked and while the audible dialog content is being audibly rendered via the one or more speakers of the client device, the client device to visually render the visual multimedia content via a display of the client device.

12. The method of claim 1, wherein the given dialog content includes multimedia content information associated with the given multimedia content.

13. The method of claim 1, wherein the given dialog content includes news information or sports information that is not associated with the given multimedia content.

14. The method of claim 1, wherein the contextual data associated with the user of the client device includes one or more of: music preferences, video preferences, news source preferences, sports team preferences, or search results.

15. The method of claim 14, wherein the contextual data associated with the user of the client device does not include any explicit user input provided by the user of the client device.

16. The method of claim 1, further comprising:

prior to receiving the indication of the user input to initiate the streaming of the multimedia content at the client device of the user:

fine-tuning a LLM based on a plurality of training instances to generate a fine-tuned LLM, each of the training instances including a (i) corresponding structured query, and (ii) corresponding multimedia content and corresponding dialog content associated with the corresponding structured query.

17. The method of claim 16, wherein generating the LLM output based on processing the structured LLM query comprises:

processing, using the fine-tuned LLM, the structured LLM query to generate the LLM output.

18. A system comprising:

at least one processor; and memory storing instructions that, when executed, cause the at least one processor to be operable to:

receive an indication of user input to initiate streaming of multimedia content at a client device of a user;

in response to receiving the indication of the user input to initiate the streaming of the multimedia content:

generate, based on at least contextual data associated with the user of the client device, a structured large language model (LLM) query;

generate, based on processing the structured LLM query, LLM output;

determine, based on the LLM output, given multimedia content and given dialog content, wherein the instructions to determine the given multimedia content based on the LLM output comprise instructions to:

establish, based on the LLM output, a communication session with a multimedia content service provider; and obtain, from the multimedia content service provider and during the communication session, the given multimedia content; and in response to determining the given multimedia content and the given dialog content:

cause the client device to initiate the streaming of the given multimedia content that was obtained from the multimedia content service provider and during the communication session established based on the LLM output; and cause the client device to render the given dialog content before the client device initiates the streaming of the given multimedia content or while the given multimedia content is being streamed at the client device;

determine when to generate an additional structured LLM query to continue the streaming of the multimedia content;

in response to determining to generate the additional structured LLM query to continue the streaming of the multimedia content:

generate, based on at least additional contextual data associated with the user of the client device, the additional structured LLM query;

generate, based on the additional structured LLM query, additional LLM output; and determine, based on the additional LLM output, given additional multimedia content and given additional dialog content, wherein the instructions to determine the given additional multimedia content based on the additional LLM output comprise instructions to:

continue, based on the additional LLM output, the communication session with the multimedia content service provider; and obtain, from the multimedia content service provider and during the communication session, the given additional multimedia content; and subsequent to determining the given additional multimedia content and the given additional dialog content:

cause the client device to initiate the streaming of the given additional multimedia content that was obtained from the multimedia content service provider and during the communication session continued based on the additional LLM output; and cause the client device to render the given additional dialog content before the client device initiates streaming of the given additional multimedia content or while the given additional multimedia content is being streamed at the client device.

19. A non-transitory computer-readable storage medium storing instructions that, when executed, cause at least one processor to perform operations, the operations comprising:

receiving an indication of user input to initiate streaming of multimedia content at a client device of a user;

in response to receiving the indication of the user input to initiate the streaming of the multimedia content:

generating, based on at least contextual data associated with the user of the client device, a structured large language model (LLM) query;

generating, based on processing the structured LLM query, LLM output;

determining, based on the LLM output, given multimedia content and given dialog content, wherein determining the given multimedia content based on the LLM output comprises:

establishing, based on the LLM output, a communication session with a multimedia content service provider; and obtaining, from the multimedia content service provider and during the communication session, the given multimedia content; and in response to determining the given multimedia content and the given dialog content:

causing the client device to initiate the streaming of the given multimedia content that was obtained from the multimedia content service provider and during the communication session established based on the LLM output; and causing the client device to render the given dialog content before the client device initiates the streaming of the given multimedia content or while the given multimedia content is being streamed at the client device;

determining when to generate an additional structured LLM query to continue the streaming of the multimedia content;

in response to determining to generate the additional structured LLM query to continue the streaming of the multimedia content:

generating, based on at least additional contextual data associated with the user of the client device, the additional structured LLM query;

generating, based on the additional structured LLM query, additional LLM output; and determining, based on the additional LLM output, given additional multimedia content and given additional dialog content, wherein determining the given additional multimedia content based on the additional LLM output comprises:

continuing, based on the additional LLM output, the communication session with the multimedia content service provider; and obtaining, from the multimedia content service provider and during the communication session, the given additional multimedia content; and subsequent to determining the given additional multimedia content and the given additional dialog content:

causing the client device to initiate the streaming of the given additional multimedia content that was obtained from the multimedia content service provider and during the communication session continued based on the additional LLM output; and causing the client device to render the given additional dialog content before the client device initiates streaming of the given additional multimedia content or while the given additional multimedia content is being streamed at the client device.

\* \* \* \* \*